US008696360B2

(12) United States Patent
Cvencek et al.

(10) Patent No.: US 8,696,360 B2
(45) Date of Patent: Apr. 15, 2014

(54) METHOD AND SYSTEM FOR DEVELOPING AND ADMINISTERING SUBJECT-APPROPRIATE IMPLICIT-ASSOCIATION TESTS

(75) Inventors: Dario Cvencek, Seattle, WA (US); Andrew Meltzoff, Seattle, WA (US); Anthony G. Greenwald, Seattle, WA (US); Craig Harris, Seattle, WA (US)

(73) Assignee: University of Washington Center for Commercialization, Seattle, WA (US)

( * ) Notice: Subject to any disclaimer, the term of this patent is extended or adjusted under 35 U.S.C. 154(b) by 0 days.

(21) Appl. No.: 13/252,908

(22) Filed: Oct. 4, 2011

(65) Prior Publication Data

US 2012/0021399 A1 Jan. 26, 2012

Related U.S. Application Data

(63) Continuation-in-part of application No. 12/150,947, filed on Apr. 30, 2008, now abandoned.

(51) Int. Cl.
*G09B 19/00* (2006.01)
*G09B 3/00* (2006.01)

(52) U.S. Cl.
USPC .............................. 434/236; 434/323; 434/350

(58) Field of Classification Search
USPC ........................................ 435/236, 323, 350
See application file for complete search history.

(56) References Cited

U.S. PATENT DOCUMENTS

| | | | | |
|---|---|---|---|---|
| 5,807,114 A * | 9/1998 | Hodges et al. | ................. | 434/236 |
| 6,030,226 A * | 2/2000 | Hersh | ............................ | 434/236 |
| 6,463,786 B1 * | 10/2002 | Behan et al. | ................. | 73/23.34 |
| 2004/0167380 A1 * | 8/2004 | Simon | ............................ | 600/300 |
| 2005/0060222 A1 * | 3/2005 | White | ............................ | 705/10 |
| 2005/0089832 A1 * | 4/2005 | McClusky | ..................... | 434/278 |
| 2005/0130113 A1 * | 6/2005 | Bergan | ............................ | 434/350 |
| 2007/0012325 A1 * | 1/2007 | Greenwald | ..................... | 128/898 |
| 2007/0117072 A1 * | 5/2007 | Adjali et al. | ................... | 434/236 |
| 2008/0108038 A1 * | 5/2008 | Rogers et al. | ................... | 434/350 |
| 2008/0261186 A1 * | 10/2008 | Hurling | .......................... | 434/236 |
| 2008/0319827 A1 * | 12/2008 | Yee et al. | .......................... | 705/10 |
| 2009/0130640 A1 * | 5/2009 | Hardy et al. | ................... | 434/236 |

OTHER PUBLICATIONS

Anthony G Greenwald, Debbie E McGhee and Jordan L K Schwartz, "Measuring Individual Differences in Implicit Cognition: The Implicit Association Test", 1998, Journal of Personality and Social Psychology, vol. 74, No. 6, p. 1464-1480.*
Anthony G Greenwald and Shelly D Farnham "Using the Implicit Test to Measure Self-Esteem and Self Concept" 2000 „Journal of Personality and Social Psychology, vol. 79, No. 6, p. 1022-1038.*

* cited by examiner

*Primary Examiner* — Robert J Utama
*Assistant Examiner* — Sadaruz Zaman

(57) ABSTRACT

The current application is directed to developing and administering subject-appropriate ITAs. The various to developing and administering subject-appropriate ITAs evaluate many aspects of ITA content, content presentation, and administration with regard to particular categories of test subjects in order to develop subject-appropriate ITAs ("SAITAs") and to administer SAITAs appropriately to the categories of test subjects for which the tests are developed. Aspects of SAITA presentation and administration that are evaluated include input devices, presentation formats, presentation language, presentation media, colors used in presentation of tutorials and stimuli, words, pictures, and symbols used in a presentation of tutorials and stimuli, the pace and length of various portions of SAITAs, human vs. computer administration of SAITAs, presentation of feedback to test subjects during SAITAs, ITAs and many other aspects of ITA content, content presentation, and administration. SAITAs employ systematic methods for both development and administration of SAITAs.

23 Claims, 34 Drawing Sheets

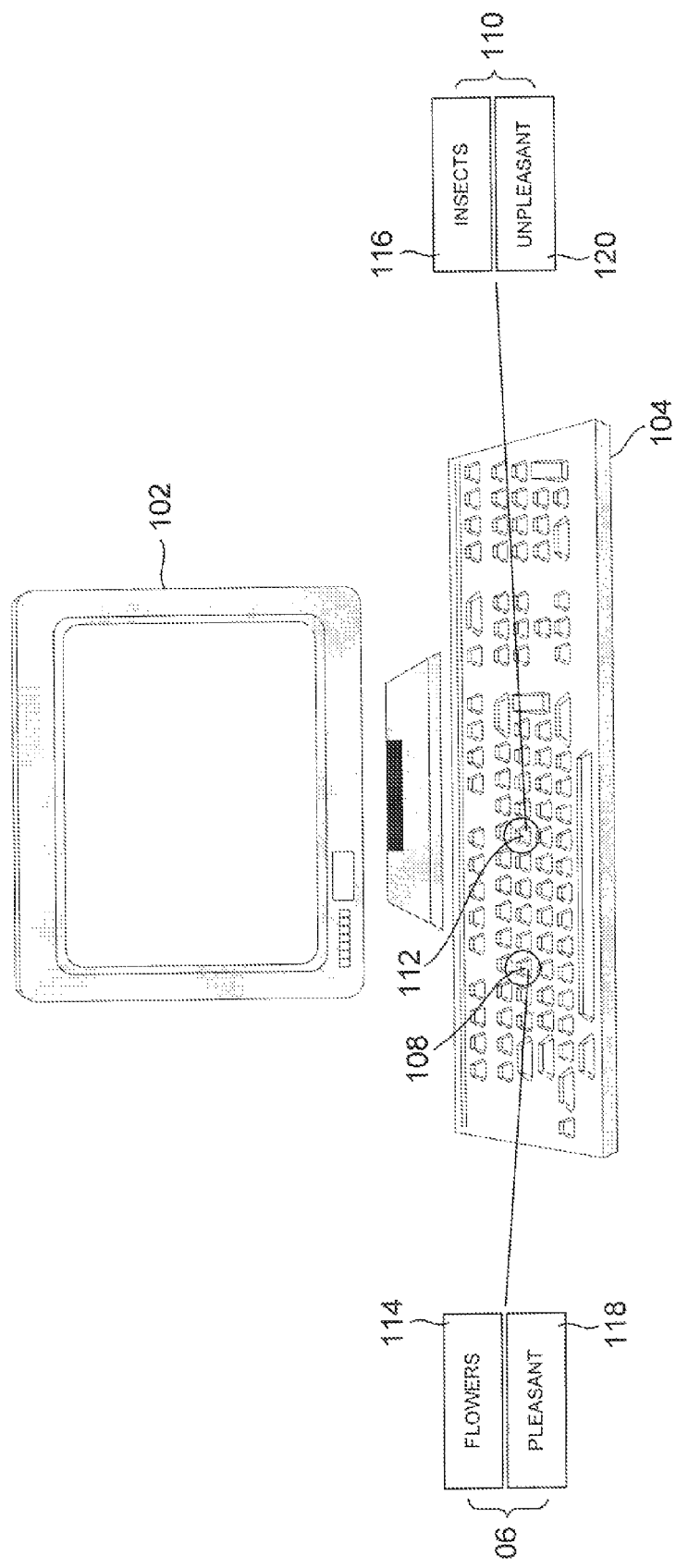

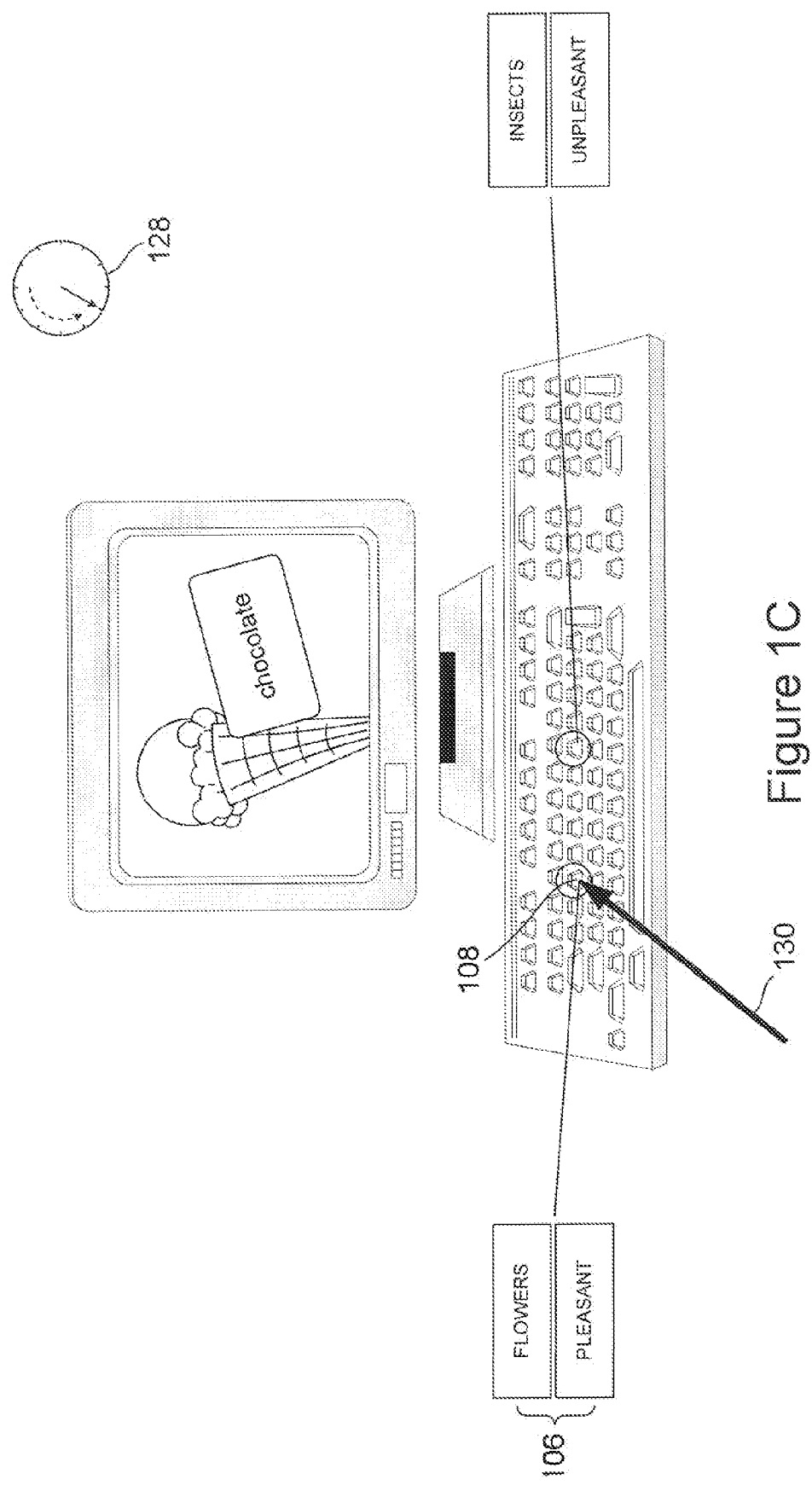

CONGRUENT BLOCK
(Block 1)      202

| Stimulus | Latency | Correct? |
|---|---|---|
| daffodil | 0.85 | Y |
| ice cream | 1.69 | N |
| ant | 0.20 | Y |
| vaccination | 0.83 | Y |
| tropical beach | 0.81 | Y |
| rose | 10.62 | Y |
| garbage | 0.81 | Y |
| sunflower | 0.75 | Y |
| beetle | 0.97 | N |
| cemetery | 2.87 | N |
| lollipop | 0.69 | Y |
| caterpillar | 0.73 | Y |

INCONGRUENT BLOCK
(Block 2)      206

| Stimulus | Latency | Correct? |
|---|---|---|
| ice cream | 0.89 | Y |
| vaccination | 2.3 | N |
| rose | 0.87 | Y |
| sunflower | 0.86 | Y |
| cemetery | 0.91 | Y |
| caterpillar | 0.92 | Y |
| daffodil | 10.31 | Y |
| ant | 0.85 | Y |
| tropical beach | 0.20 | N |
| garbage | 8.76 | N |
| beetle | 0.84 | Y |
| lollipop | 0.83 | Y |

204

| Stimulus | Latency | Correct? |
|---|---|---|
| caterpillar | 0.62 | Y |
| rose | 0.96 | N |
| garbage | 0.59 | Y |
| cemetery | 0.63 | Y |
| lollipop | 0.62 | Y |
| daffodil | 0.57 | Y |
| vaccination | 0.59 | Y |
| tropical beach | 1.63 | N |
| ice cream | 0.65 | Y |
| sunflower | 0.61 | Y |
| beetle | 0.56 | Y |
| ant | 0.55 | Y |

208

| Stimulus | Latency | Correct? |
|---|---|---|
| rose | 0.72 | Y |
| cemetery | 0.71 | Y |
| daffodil | 0.73 | Y |
| tropical beach | 0.69 | Y |
| sunflower | 0.68 | Y |
| ant | 0.69 | Y |
| caterpillar | 0.72 | Y |
| garbage | 0.66 | Y |
| lollipop | 0.67 | Y |
| vaccination | 0.70 | Y |
| ice cream | 0.66 | Y |
| beetle | 0.65 | Y |

Figure 2A

CONGRUENT BLOCK
(Block 1)

| Stimulus | Latency | Correct? |
|---|---|---|
| daffodil | 0.65 | Y |
| ice cream | 1.69 | N |
| ant | 0.20 | Y |
| vaccination | 0.83 | Y |
| tropical beach | 0.81 | Y |
| ~~rose~~ | ~~10.62~~ | ~~Y~~ |
| garbage | 0.81 | Y |
| sunflower | 0.75 | Y |
| beetle | 0.97 | N |
| cemetery | 2.87 | N |
| lollipop | 0.69 | Y |
| caterpillar | 0.73 | Y |

P1
210

| Stimulus | Latency | Correct? |
|---|---|---|
| caterpillar | 0.62 | Y |
| rose | 0.96 | N |
| garbage | 0.59 | Y |
| cemetery | 0.63 | Y |
| lollipop | 0.62 | Y |
| daffodil | 0.57 | Y |
| vaccination | 0.59 | Y |
| tropical beach | 1.63 | N |
| ice cream | 0.65 | Y |
| sunflower | 0.61 | Y |
| beetle | 0.56 | Y |
| ant | 0.55 | Y |

T1
212

INCONGRUENT BLOCK
(Block 2)

| Stimulus | Latency | Correct? |
|---|---|---|
| ice cream | 0.89 | Y |
| vaccination | 2.3 | N |
| rose | 0.87 | Y |
| sunflower | 0.88 | Y |
| cemetery | 0.91 | Y |
| caterpillar | 0.92 | Y |
| ~~daffodil~~ | ~~10.31~~ | ~~Y~~ |
| ant | 0.85 | Y |
| tropical beach | 0.20 | N |
| garbage | 8.76 | N |
| beetle | 0.84 | Y |
| lollipop | 0.83 | Y |

P2
214

| Stimulus | Latency | Correct? |
|---|---|---|
| rose | 0.72 | Y |
| cemetery | 0.71 | Y |
| daffodil | 0.73 | Y |
| tropical beach | 0.69 | Y |
| sunflower | 0.58 | Y |
| ant | 0.69 | Y |
| caterpillar | 0.72 | Y |
| garbage | 0.68 | Y |
| lollipop | 0.67 | Y |
| vaccination | 0.70 | Y |
| ice cream | 0.66 | Y |
| beetle | 0.65 | Y |

T2
216

Figure 2B $$avg(P1c) = \frac{5.67}{8} = .71$$

$$avg(T1c) = \frac{5.99}{10} = .60$$

$$avg(P2c) = \frac{6.99}{8} = .87$$

$$avg(T2c) = \frac{8.3}{12} = .69$$

$$avg_p = \frac{29.45}{22} = 1.34$$

$$avg_t = 16.88 = .70$$

$$\sigma_p = 1.72$$

$$\sigma_t = .044$$

Figure 2C

| | |
|---|---|
| daffodil | 0.85 |
| ice cream | 1.69 |
| ant | 0.20 |
| vaccination | 0.83 |
| tropical beach | 0.81 |
| rose | 10.62 |
| garbage | 0.81 |
| sunflower | 0.75 |
| beetle | 0.97 |
| cemetery | 2.87 |
| lollipop | 0.69 |
| caterpillar | 0.73 |

P1f

| | |
|---|---|
| ice cream | 0.89 |
| vaccination | 2.3 |
| rose | 0.87 |
| sunflower | 0.88 |
| cemetery | 0.91 |
| caterpillar | 0.92 |
| daffodil | 10.31 |
| ant | 0.85 |
| tropical beach | 0.20 |
| garbage | 8.76 |
| beetle | 0.84 |
| lollipop | 0.83 |

P2f

| | |
|---|---|
| caterpillar | 0.62 |
| rose | 0.96 |
| garbage | 0.59 |
| cemetery | 0.63 |
| lollipop | 0.62 |
| daffodil | 0.57 |
| vaccination | 0.59 |
| tropical beach | 1.63 |
| ice cream | 0.65 |
| sunflower | 0.61 |
| beetle | 0.56 |
| ant | 0.55 |

T1f

| | |
|---|---|
| rose | 0.72 |
| cemetery | 0.71 |
| daffodil | 0.73 |
| tropical beach | 0.69 |
| sunflower | 0.68 |
| ant | 0.69 |
| caterpillar | 0.72 |
| garbage | 0.68 |
| lollipop | 0.67 |
| vaccination | 0.70 |
| ice cream | 0.66 |
| beetle | 0.65 |

T2f

Figure 2D $$avg(P1f) = \frac{12.21}{11} = 1.11$$

$$avg(T1f) = \frac{8.58}{12} = .715$$

$$avg(P2f) = \frac{19.42}{11} = 1.77$$

$$avg(T2f) = \frac{8.3}{12} = .69$$

$$score = \frac{\frac{1.77-1.11}{1.72} + \frac{.69-.715}{.044}}{2} = -.09$$

Figure 2E

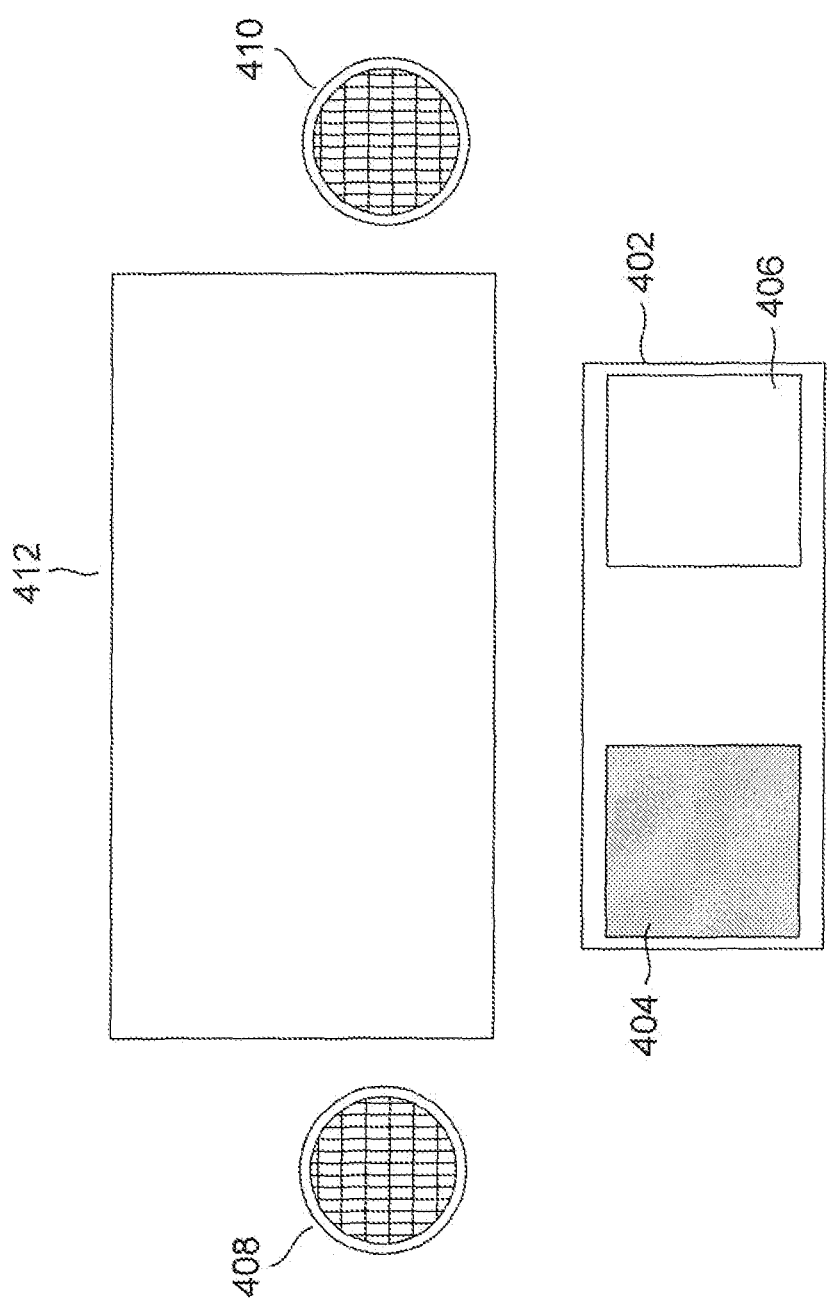

"WRONG"

"GOOD JOB"

METHOD AND SYSTEM FOR DEVELOPING AND ADMINISTERING SUBJECT-APPROPRIATE IMPLICIT-ASSOCIATION TESTS

CROSS-REFERENCE TO RELATED APPLICATION

This application is a continuation-in-part of application Ser. No. 12/150,947, filed Apr. 30, 2008 now abandoned.

STATEMENT OF GOVERNMENT INTEREST

This invention has been made with Government support under Contract No. SBE-0354453, awarded by the National Science Foundation. The government has certain rights in the invention.

TECHNICAL FIELD

The present invention is related to psychological testing and, in particular, to a method and system for developing subject-appropriate implicit tests of associations and for administering subject-appropriate implicit tests of associations in subject-appropriate ways.

BACKGROUND OF THE INVENTION

The implicit-association tests, first described in a 1998 publication, was developed to test the strength of subjects' mental associations between concepts and ideas based on the test subjects' performance on relatively simple, computer-proctored tests during which subjects categorize various computer-presented stimuli into different categories by manual input via a keyboard or other input device. Implicit-association tests ("IATs") are described, in greater detail, in a following section. Please note that the term "subject" refers to a person to whom an IAT or other test is administered. Please also note that, although not currently used in the literature, a perhaps better name for the implicit association test is "implicit test of associations." The test is implicit, in the sense that the test does not query test subjects for explicitly-stated responses. However, it is often assumed that the adjective "implicit" modifies the term "association," which is incorrect. Therefore, in the following, the name "implicit test of associations" ("ITA") is used, in preference to the commonly used "implicit association test."

While ITAs have proved effective in evaluating strengths of association between various concepts and categories held by reasonably well-educated, literate, non-disabled adults, the standard ITA format has proved difficult or impossible to administer to various other categories of test subjects, including preschool children, illiterate adults, people with various types of disabilities, and others. Furthermore, ITA development has been largely empirical, generally without a systematic approach to evaluating particular ITA suitability for various categories of subjects. ITA administrators and developers have recognized the need for methods and systems for more effective administration of ITAs to, and development of ITAs for, particular categories of subjects.

SUMMARY OF THE INVENTION

The current application is directed to developing and administering subject-appropriate ITAs. Various methods disclosed in the current application evaluate many aspects of ITA content, content presentation, and administration with regard to particular categories of test subjects in order to develop subject-appropriate ITAs ("SAITAs") and to administer SAITAs appropriately to the categories of test subjects for which the tests are developed. Exemplary categories of test subjects may include adults with a particular class of disabilities, preschool children, illiterate adults, elderly adults, and emigrants lacking exposure to computers and to the dominant culture of the society in which tests are developed and administered. Aspects of SAITA presentation and administration that are evaluated include input devices, presentation formats, presentation language, presentation media, colors used in presentation of tutorials and stimuli, words, pictures, and symbols used in a presentation of tutorials and stimuli, the pace and length of various portions of SAITAs, human vs. computer administration of SAITAs, presentation of feedback to test subjects during SAITAs, administration of Likert scales as a method of verification of correctly administered SAITAs, continuous monitoring of the test-subject's responses, attitudes toward the stimulus/response interaction, attentiveness, and other characteristics to ensure that meaningful responses are being measured during the SAITA, additional continuously applied internal consistency checks and feedback loops, and many other aspects of ITA content, content presentation, and administration. Testing approaches to which the current application is directed employ systematic methods for both development and administration of SAITAs.

BRIEF DESCRIPTION OF THE DRAWINGS

FIGS. 1A-F illustrate the general approach of the ITA.

FIGS. 2A-E illustrates processing of elapsed times of response, or latencies, measured during administration of the exemplary ITA described with reference to FIGS. 1A-F.

FIG. 4 illustrates various innovations regarding input devices as well as stimulus and information presentation.

DETAILED DESCRIPTION OF THE INVENTION

Figure 1B:
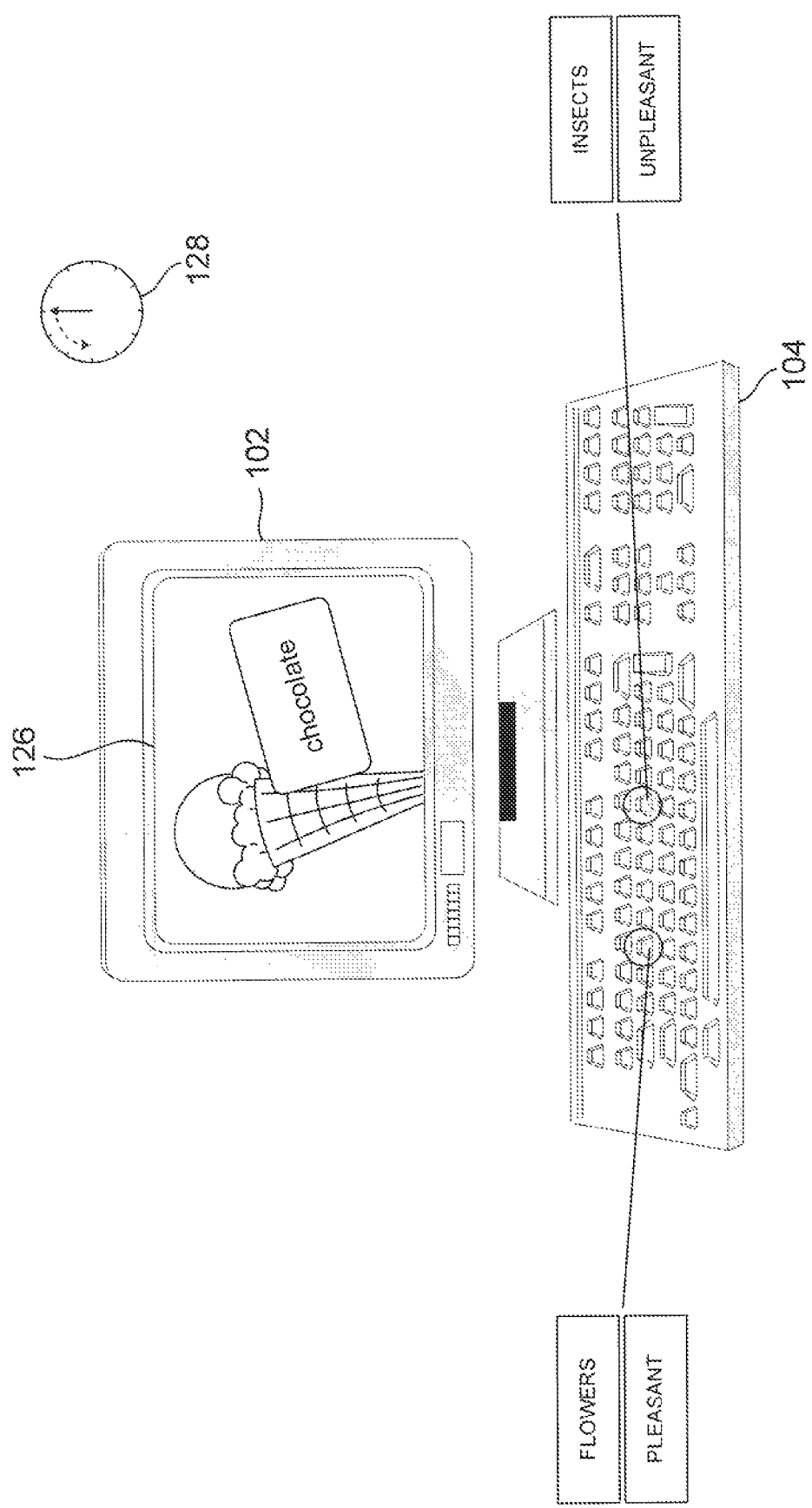

The current application is directed to development and administration of subject-appropriate implicit test of associations ("SAITAs") based on previously developed implicit tests of associations ("ITAs"). To facilitate description of the SAITAs disclosed in the current application, standard ITAs are first described.

FIGS. 1A-F illustrate the general approach of the ITA. The ITA is administered via a computer, generally a personal computer or workstation. The stimuli that elicit test-subject responses are generally provided visually, on a computer display 103. Subjects respond to stimuli by depressing particular keys of a keyboard 104. During initial phases of ITA administration, a subject is instructed to depress a first key 108 when pictures or other visual stimuli related to a first pair of concepts 106 are presented to the subject and to depress a second key 112 when pictures or other visual stimuli related to a second pair 110 of concepts are presented to the subject. During these initial phases, the subject is provided with practice stimulus/response interactions to facilitate learning the concept-pair/response-key combinations. The first concept in each pair of concepts, 114 and 116, constitute a first conceptual dimension, or target concepts, and the second concept in each pair of concepts, 118 and 120, constitute a second conceptual dimension, or attribute concepts. In the example shown in FIG. 1A, the target concepts relate to objects, and include the two different types of objects: {flowers, insects}. The attribute concepts, in the example shown in FIG. 1A, include the two feelings or emotions: {pleasant, unpleasant}.

During the testing phase of an ITA, the test subject is instructed to depress the appropriate key in response to presentation of a stimulus, generally a picture or phrase that clearly belongs to one of the four concepts within the two pairs of concepts. In the case of the example of FIG. 1A, each presented stimulus is clearly associated with, or belongs to, one of the four concepts: {flowers, insects, pleasant, unpleasant}. FIG. 1B illustrates an exemplary stimulus presentation. In FIG. 1B, a picture of ice cream and candy 126 is displayed on the computer display device 102. At the instant at which the picture is displayed, a computational timing device 128 is initialized. As shown in FIG. 1C, the user, in response to viewing the stimulus image, depresses 130 the key 108 appropriate for inputting a response to visual display a concept of the concept pair {flowers, pleasant} 106, since candy and ice cream clearly associate with the concept "pleasant," and do not associate with the other concepts "flowers," "insects," and "unpleasant," at least to those without potentially fatal allergies to ice cream and candy. At the instant when the key is depressed by the subject, the elapsed time between display of the stimulus and the user response is measured via the computational timing device 128. The computational timing device is generally based on a hardware system clock and various related operating-system functions.

Figure 1D:
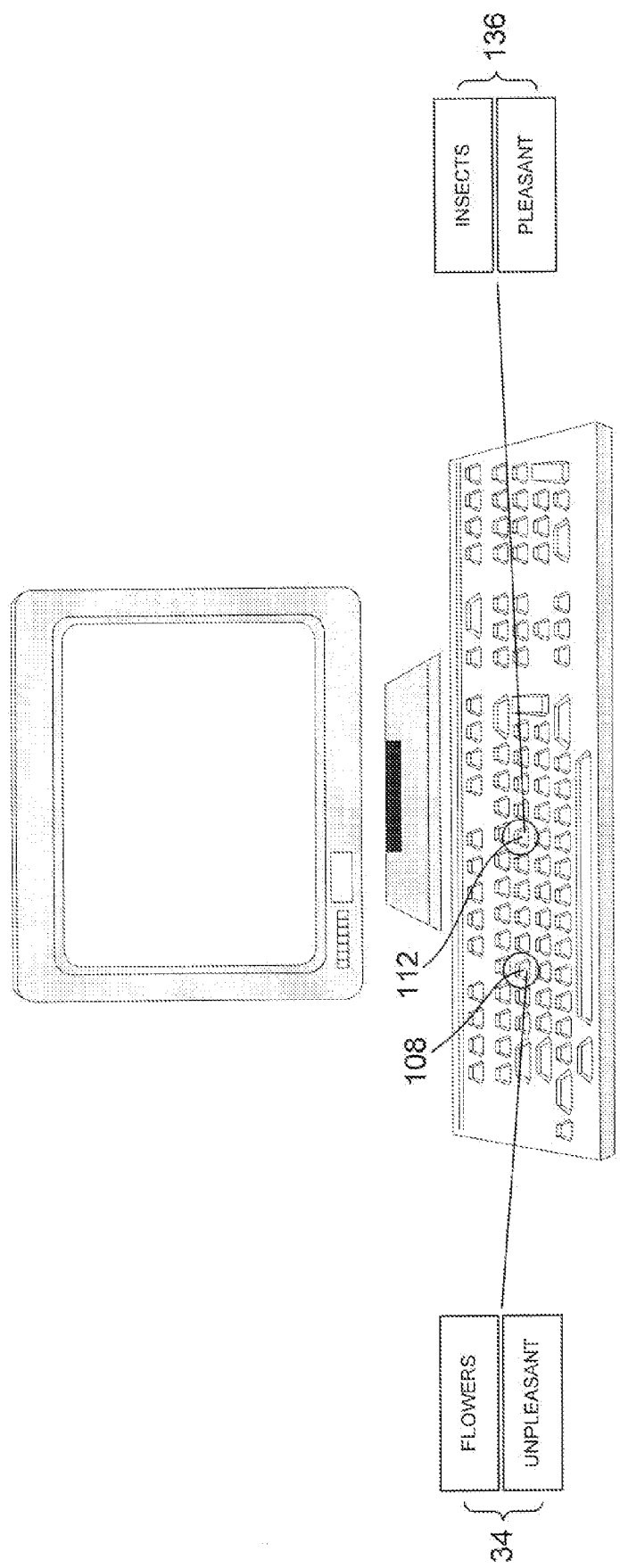
Figure 1E:
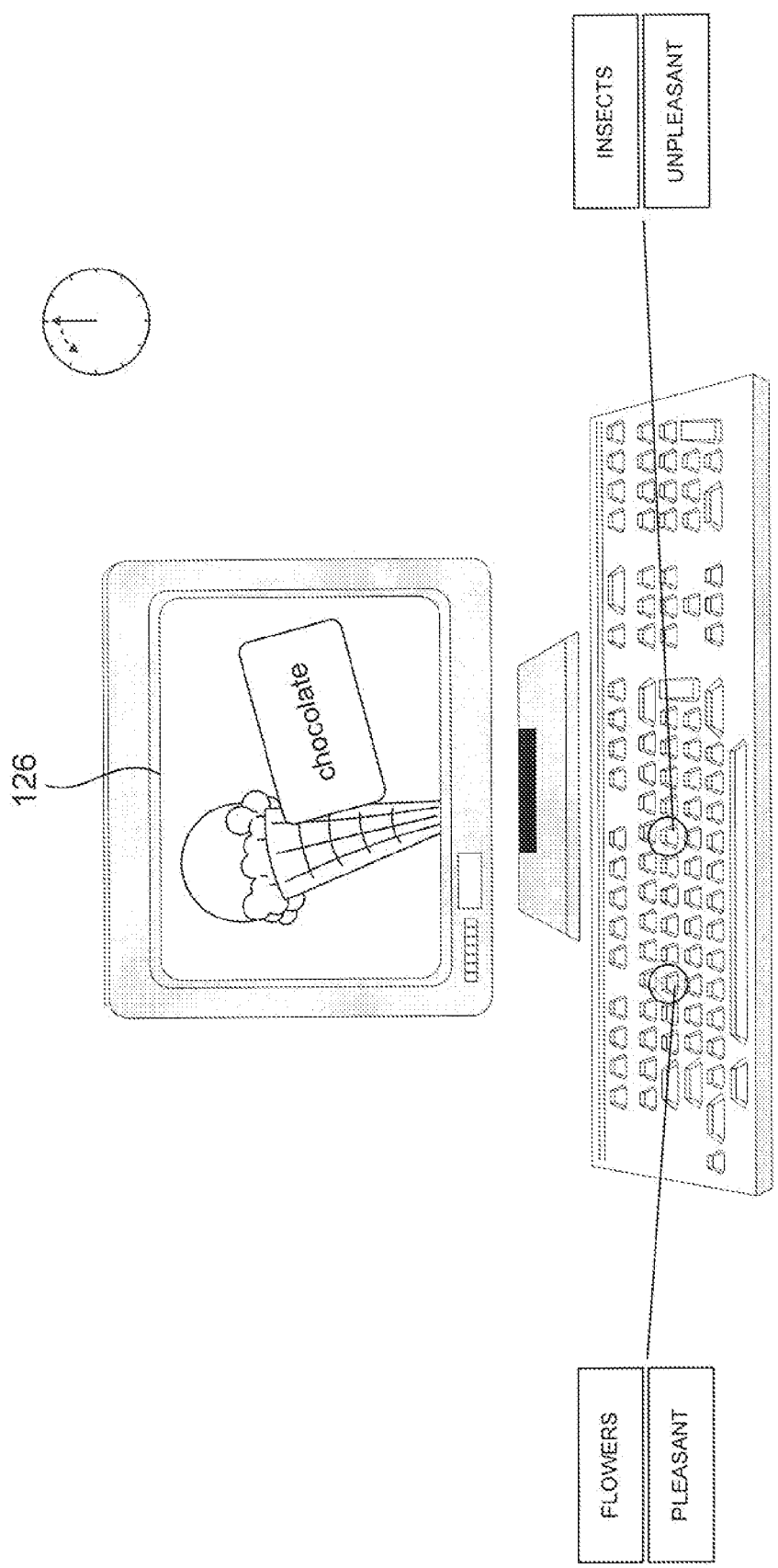
Figure 1F:
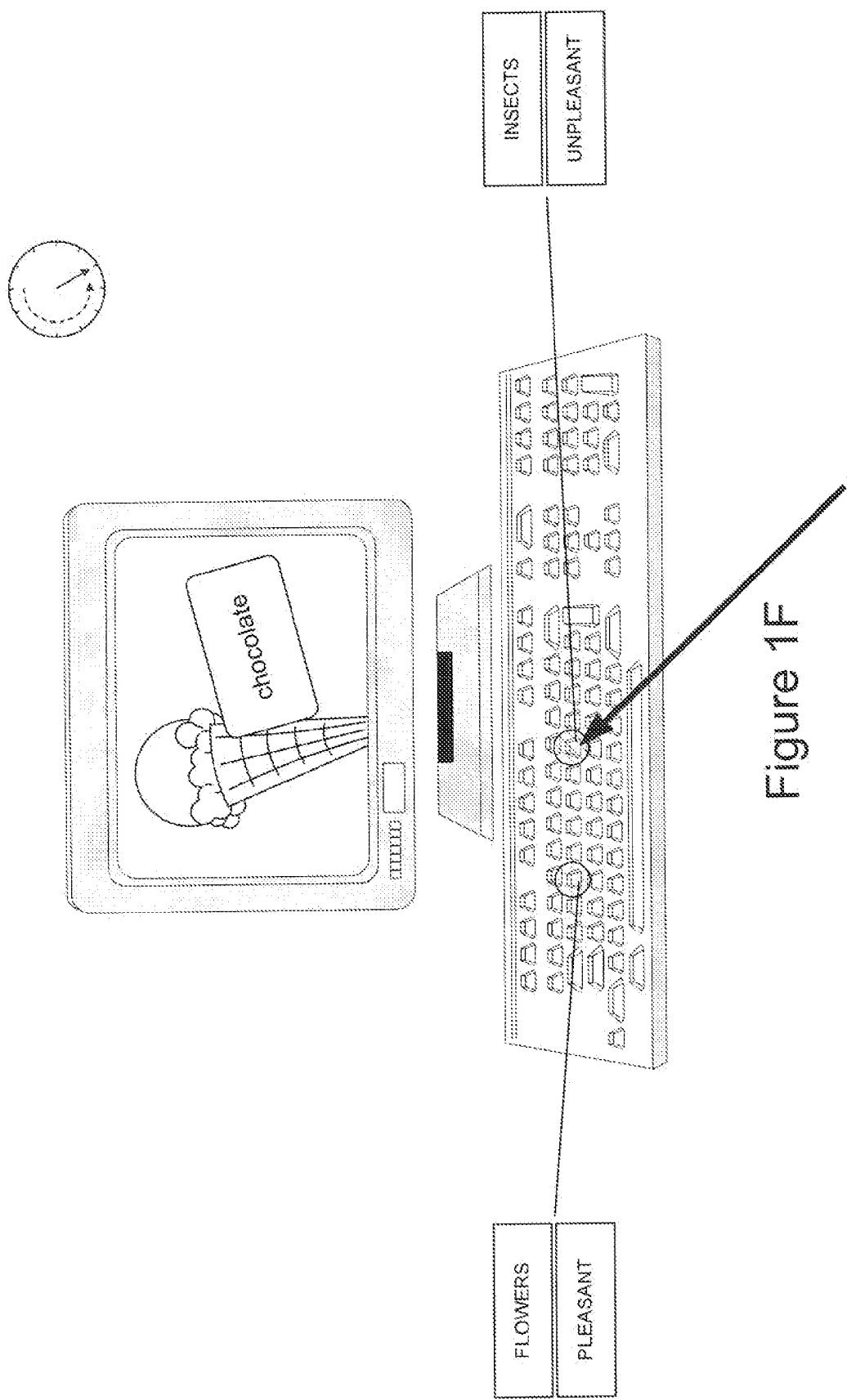

In general, an ITA test comprises two blocks, each block in turn comprising a fixed number of stimulus-presentation/test-subject-response pairs, such as the stimulus presentation and response illustrated in FIGS. 1B-C. During the first block, the concept-pair/response-key combinations remain constant. Then, the relationship between the keys to be depressed and the concepts or categories presented to the subject is changed. In a tutorial administered during the second block, the subject is instructed, as shown in FIG. 1D, to depress a first key 108 when pictures or other visual stimuli related to the concept pair {flowers, unpleasant} 134 are presented to the subject and to depress a second key 112 when pictures or other visual stimuli related to the concept pair {insects, pleasant} 136 are presented to the subject. The subject is again provided with practice stimulus/response interactions to facilitate learning the new concept-pair/response-key combinations. As shown in FIGS. 1E-F, the stimuli, such as picture 126, are again presented, during the second block, and the elapsed time between stimulus presentation and subject response are again measured. In general, the target concepts, or concepts of the first conceptual dimension, are reversed, in the second block, although it is possible to reverse the attribute concepts, or the concepts of the second conceptual dimension, in alternative examples.

Often, the developer of an ITA begins with a hypothesis. For example, with regard to the ITA described with reference to FIGS. 1A-F, the developer may hypothesize that people generally have a preference for flowers over insects (i.e. associate flowers with pleasant emotions and insects with unpleasant emotions). Therefore, during the first block, the concept-pair/response-key combinations reflect the hypothesized association between flowers and pleasant emotions and between insects and unpleasant emotions, and the first block is therefore referred to as the "congruent block." By contrast, the second block, during which the keys are associated with concepts that are hypothesized to be clashing, or discordant, is referred to as the "incongruent block." While the concepts or categories paired in the congruent block may be generally hypothesized to reflect natural associations held by one or more classes of subjects and the concepts or categories paired in the incongruent block may be generally hypothesized to run counter to associations commonly held by one or more classes of subjects, the responses of any given subject during an ITA may indicate that the subject strongly associates the concepts or categories paired in the congruent block, weakly associates the concepts or categories paired in the congruent block, exhibits an equally strong association between the concepts or categories paired in the congruent block, weakly associates the concepts or categories paired in the incongruent block, or strongly associates the concepts or categories paired in the incongruent block. In certain ITAs, the test developer may not have a prior assumptions of the strength of association between the different concepts or categories for which strength of association is tested, in which cases the phrases "first block" and "second block" may be preferred to the phrases "congruent block" and "incongruent block." FIGS. 2A-E illustrates processing of elapsed times of response, or latencies, measured during administration of the exemplary ITA described with reference to FIGS. 1A-F. A first table 202 includes the elapsed times of responses to each of a series of pictures displayed in a practice session within the congruent block of the test, a second table 204 includes the elapsed times of responses to each of a series of pictures displayed in the test portion of the congruent block, a third table 206 includes the elapsed times of responses to each of a series of pictures displayed in a practice session within the incongruent block of the test, and a fourth table 208 includes the elapsed times for responses to pictures presented as stimuli in the test portion of the in congruent block. Note that the same pictures are presented in all four portions of the ITA, although the order of presentation may vary. Each entry in each table includes an indication of the stimulus to which the latency applies, as well as an indication of whether or not the response was correct. In general, a subject is required to provide a correct answer to each displayed stimulus. When the response is incorrect, a visual indication is displayed, and the subject is required to input the correct response. In general, latencies for initially incorrect responses are therefore greater in value than latencies for correct responses, due to the need to input a second, correct response following an initially incorrect response.

There are a variety of ways to compute meaningful scores. The validity of different scoring methods can be tested by comparing scores derived from ITA response latencies to subjects' preferences for, or identification with, concepts and categories measured by alternative, self-expression-based testing, such as Likert-type testing. One approach to scoring, for a two-block ITA test, each block of which includes a practice strength-of-association-test session ("P") and a strength-of-association test ("T") is next provided, with reference to FIGS. 2B-E.

First, four sets of data P1, T1, P2, and T2 are defined as the latencies measured for the above-mentioned practice sessions and test, as shown in FIG. 2B and expressed below:

$$P1 = \{P_{1,1}, P_{1,2}, \ldots, P_{1,n}\} =$$

n measured latencies for practice strength-of-association-test session in first block, each of which is less than a cutoff latency value $$T1 = \{T_{1,1}, T_{1,2}, \ldots, T_{1,m}\} =$$

m measured latencies for strength-of-association test session in first block, each of which is less than a cutoff latency value $$P2 = \{P_{2,1}, P_{2,2}, \ldots, P_{2,q}\} =$$

q measured latencies for practice strength-of-association-test session in second block, each of which is less than a cutoff latency value $$T2 = \{T_{2,1}, T_{2,2}, \ldots, T_{2,r}\} =$$

r measured latencies for strength-of-association test session in second block, each of which is less than a cutoff latency value In other words, entries of the original table with latency values greater than a cutoff value, in the present case 10 seconds, are discarded to produce the four sets of data P1 (210 in FIG. 2B), T1 (212 in FIG. 2B), P2 (214 in FIG. 2B), and T2 (216 in FIG. 2B).

Next, a test is made to ensure that, after the elimination of the extreme values, there are sufficient remaining values to allow for a meaningful test score to be calculated:

$$\text{if } \begin{pmatrix} (n < \text{practice\_threshold AND } m < \text{threshold}) \text{ OR} \\ (q < \text{practice\_threshold AND } r < \text{threshold}) \end{pmatrix} \text{ test invalid}$$

Then, the number of entries in the four data sets P1, T1, P2, and T2 with latency values below some low-value threshold are determined, and, if the ratio of the number of such extreme-valued entries to total entries exceeds a threshold, in the present case, 0.1, the test is deemed invalid, since a large number of extremely short response times indicates that the subject was not properly evaluating displayed stimuli prior to inputting responses to the stimuli:

$$P1e = \{P_{1,i} : P_{1,i} < \text{low\_cutoff\_latency}\}$$

$$T1e = \{T_{1,i} : T_{1,i} < \text{low\_cutoff\_latency}\}$$

$$P2e = \{P_{2,i} : P_{2,i} < \text{low\_cutoff\_latency}\}$$

$$T2e = \{T_{2,i} : T_{2,i} < \text{low\_cutoff\_latency}\}$$

$$\text{numExtreme} = \text{sizeof}(P1e) + \text{sizeof}(P1e) + \text{sizeof}(P1e) + \text{sizeof}(P1e)$$

$$\text{if } \left(\frac{\text{numExtreme}}{n+m+q+r} > 0.1\right) \text{ test invalid}$$

Next, average latency for correct responses for each of the four data sets is computed, as indicated below, with the average latency values for the example ITA results of FIGS. 2A-E shown in FIG. 2C:

$$P1c = \{P_{1,i} : \text{answer}(P_{1,i}) == \text{correct}\}$$

$$T1c = \{T_{1,i} : \text{answer}(T_{1,i}) == \text{correct}\}$$

$$P2c = \{P_{2,i} : \text{answer}(P_{2,i}) == \text{correct}\}$$

$$T2c = \{T_{2,i} : \text{answer}(T_{2,i}) == \text{correct}\}$$

$$\text{avg}(P1c) = \frac{\sum_{i=1}^{\text{sizeof}(P1c)} P1c_i}{\text{sizeof}(P1c)}$$

$$\text{avg}(T1c) = \frac{\sum_{i=1}^{\text{sizeof}(T1c)} T1c_i}{\text{sizeof}(T1c)}$$

$$\text{avg}(P2c) = \frac{\sum_{i=1}^{\text{sizeof}(P2c)} P2c_i}{\text{sizeof}(P2c)}$$

$$\text{avg}(T2c) = \frac{\sum_{i=1}^{\text{sizeof}(T2c)} T2c_i}{\text{sizeof}(T2c)}$$

Next, standard deviations $\sigma_p$ and $\sigma_t$ for all latencies, whether or not corresponding to correct answers, are computed for the combined data set P1ÔP2 and the combined data set P1ÔP2, with the standard deviations computed for the example ITA results of FIGS. 2A-E shown in FIG. 2C:

$$\text{avg}_p = \frac{\left(\sum_{i=1}^{\text{sizeof}(P1)} P1_i\right) + \left(\sum_{i=1}^{\text{sizeof}(P2)} P2_i\right)}{\text{sizeof}(P1) + \text{sizeof}(P2)}$$

$$\text{avg}_t = \frac{\left(\sum_{i=1}^{\text{sizeof}(T1)} T1_i\right) + \left(\sum_{i=1}^{\text{sizeof}(T2)} T2_i\right)}{\text{sizeof}(T1) + \text{sizeof}(T2)}$$

$$\sigma_p = \sqrt{\frac{\left(\sum_{i=1}^{\text{sizeof}(P1)} (\text{avg}_p - P1_i)^2\right) + \left(\sum_{i=1}^{\text{sizeof}(P2)} (\text{avg}_p - P2_i)^2\right)}{\text{sizeof}(P1) + \text{sizeof}(P2)}}$$

$$\sigma_t = \sqrt{\frac{\left(\sum_{i=1}^{\text{sizeof}(T1)} (\text{avg}_t - T1_i)^2\right) + \left(\sum_{i=1}^{\text{sizeof}(T2)} (\text{avg}_t - T2_i)^2\right)}{\text{sizeof}(T1) + \text{sizeof}(T2)}}$$

Next, final data sets P1f, T1f, P2f, and T2f, as shown in FIG. 2D, are computed from data sets P1, T1, P2, and T2 by substituting, for latencies below a low-threshold value, a substitute computed latency equal to a penalty value added to an average latency for correct answers, and average latency values for each of the final data sets are computed, with the average latency values computed for the example ITA results of FIGS. 2A-E shown in FIG. 2E:

$$f(X_i) = \begin{cases} \text{when } P_{1,i} < \text{low\_cutoff\_latency}, avg(Xc) + \text{penalty}; \\ \text{otherwise}, X_i \end{cases}$$

$$P1f = \{f(P_{1,1}), f(P_{1,2}), \ldots, f(P_{1,n})\}$$

$$T1f = \{f(T_{1,1}), f(T_{1,2}), \ldots, f(T_{1,n})\}$$

$$P2f = \{f(P_{2,1}), f(P_{2,2}), \ldots, f(P_{2,n})\}$$

$$T2f = \{f(T_{2,1}), f(T_{2,2}), \ldots, f(T_{2,n})\}$$

$$avg(P1f) = \frac{\sum_{i=1}^{sizeof(P1f)} P1f_i}{sizeof(P1f)}$$

$$avg(T1f) = \frac{\sum_{i=1}^{sizeof(T1f)} T1f_i}{sizeof(T1f)}$$

$$avg(P2f) = \frac{\sum_{i=1}^{sizeof(P2f)} P2f_i}{sizeof(P2f)}$$

Finally, a test score $$avg(T2f) = \frac{\sum_{i=1}^{sizeof(T2f)} T2f_i}{sizeof(T2f)}$$

is computed as follows, with the test score computed for the example ITA results of FIGS. 2A-E shown in FIG. 2E:

$$score = \frac{\frac{P2f - P1f}{\sigma_p} + \frac{T2f - T1f}{\sigma_t}}{2}$$

When the computed test score is "0," or close to zero, there appear to be equally strong associations between the paired concepts or categories used in both blocks of the ITA. When the computed score is positive, and above a threshold value, then the subject appears to more strongly associate the paired concepts or categories used in the first block than the paired concepts or categories used in the second block. When the computed score is negative, with an absolute value above the threshold value, then the subject appears to more strongly associate the paired concepts or categories used in the second block than the paired concepts or categories used in the first block of the ITA.

ITAs have many significant advantages over more traditional types of psychological tests that require subjects to provide informational responses to questions. In many cases, a subject may intentionally or inadvertently respond insincerely, to particular types of questions, as a result of conscious or unconscious feelings, prejudices, and a sense of the test-taker's expectations. For example, a standard psychological test in which the test administrator questions the subject with regard to the subject's disposition towards members of different races may not elicit an honest expression of the subject's honest feelings and emotions, since the test is directed to a very controversial topic. As another example, a subject may assume that the test administrator is seeking certain types of responses, and may respond according to that assumption, rather than to the subject's true feelings with regard to the topic of the test. As a third example, the subject may indeed harbor an unconscious bias or prejudice, but answer explicit questions with regard to the subject's disposition towards members of different races based on the subject's conscious attitudes related to race, such as a conscious affinity to an unprejudiced, race-indifferent disposition. The ITA, by contrast, measures response time for the test subject's response to presented stimuli. When the responses require choosing input keys associated with matched, or concordant concepts, subjects generally require less time to respond to displayed stimuli than when the input keys are associated with clashing, or discordant concepts. Because the subject is encouraged to respond quickly and mechanically to the stimuli, response times tend to be far less influenced by subjects' expectations, assumptions, prejudices, and other factors that may lead to less useful results obtained in standard psychological tests.

Problems with the standard ITA were first noticed during development of an ITA-based approach to evaluating various concept associations in preschool children. The standard ITA was completely unsuitable. The standard ITA relies on subjects being literate and having sufficient familiarity with computers to be able to provide responses through standard keyboard keys, and to respond appropriately to various instructional screens and feedback. Therefore, it was necessary to re-evaluate the ITA and to develop an SAITA for preschool children. This undertaking revealed many of the aspects of generalized SAITA development and administration. For example, because ITAs measure the elapsed times for manual responses, rather than evaluate informative responses to questions, subtle effects and interferences related to stimulus presentation, ITA dynamics, particular words, colors, images, sounds, and other features of the ITA format, ITA structure, and other aspects of the ITA unrelated to the associations being evaluated may contribute to observed elapsed response times and lead to inaccurate conclusions about the strengths of associations for which the ITA is designed to evaluate.

Figure 3A:
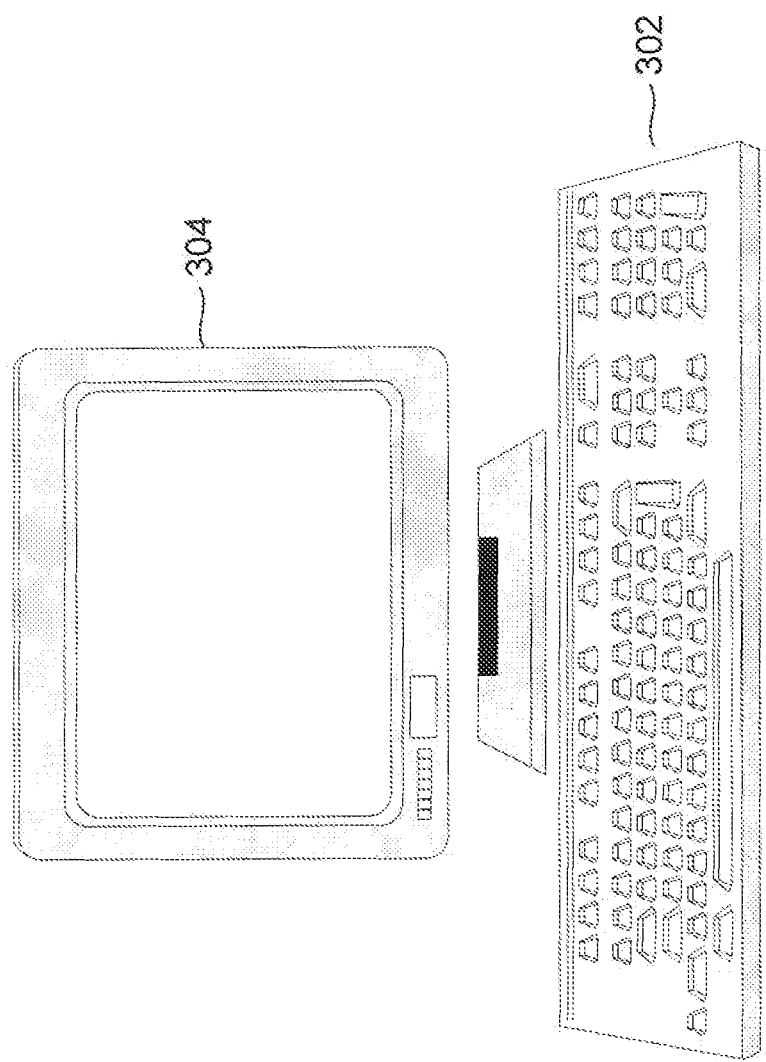
FIGS. 3A-B illustrate the principal aspects of ITA administration that need to be tailored for specific categories of subjects in order to develop and administer SAITAs.
Figure 3B:
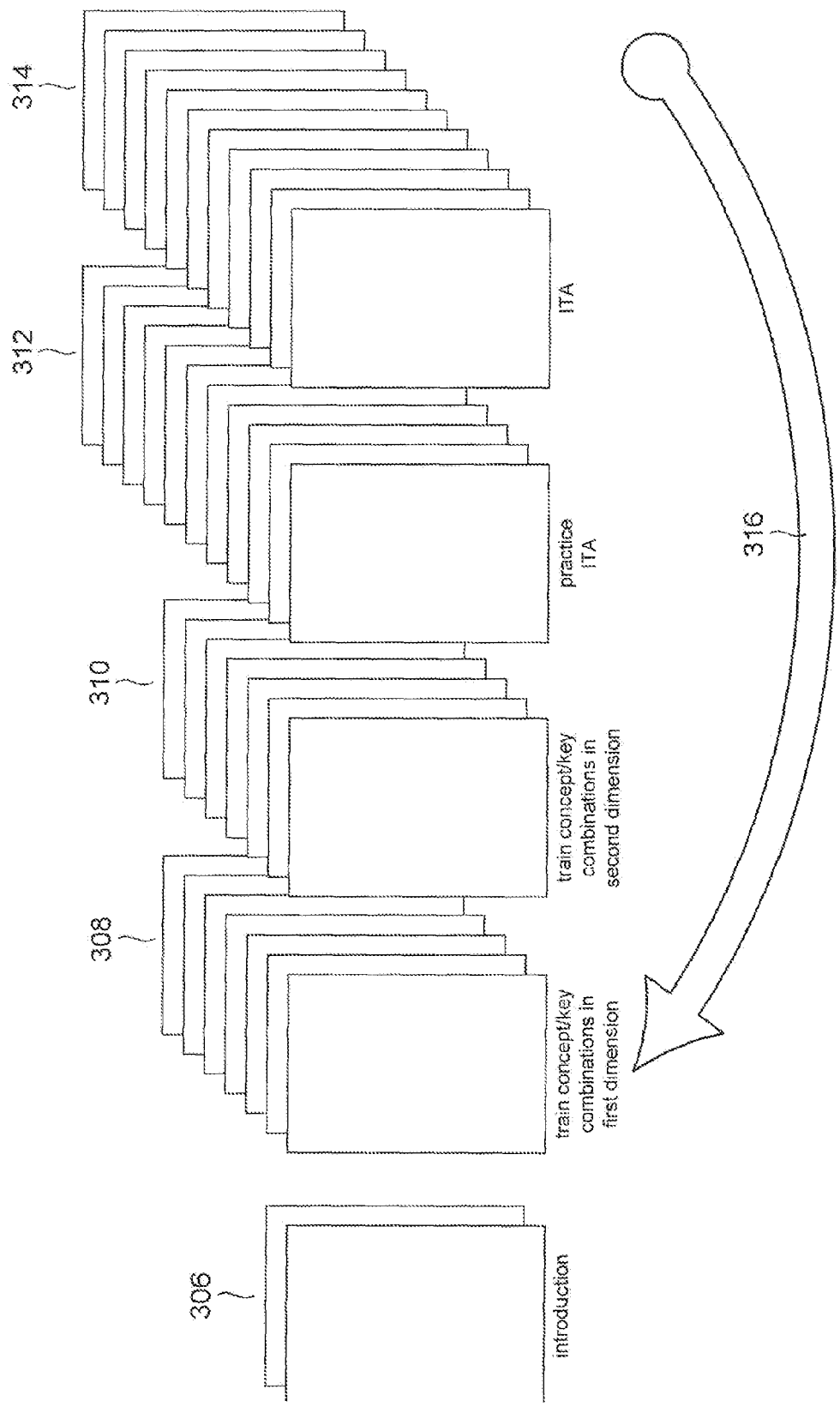

FIGS. 3A-B illustrate the principal aspects of ITA administration that need to be tailored for specific categories of subjects in order to develop and administer SAITAs. One set of aspects relates to the input device 302 and various visual presentations provided on the display device 304 during test administration. Another aspect, illustrated in FIG. 3B, relates to the general flow of an ITA. The ITA begins with several introductory screens, or displays 306, which are then followed by two or more blocks, discussed above. During each block, a number of screens or displays 308 are devoted to instructing the subject with regard to the target-concept/response-key combinations used in the block, a number of screens or displays 310 are devoted to instructing the subject with regard to the attribute-concept/response-key combinations used in the block, a practice stimulus/response sub-block is then administered via a third set of screens or displays 312, and, finally, a test sub-block is administered in a fourth set of screens or displays 314. As indicated by arrow 316 in FIG. 3B, instruction regarding the concept-pair/response-key combinations, a practice sub-block, and a test sub-block are repeated for each block of an ITA test. The flow aspect of an ITA includes a number of parameters, including the number and content of the sub-blocks within each block, such as the instruction regarding the concept-pair/response-key combinations, the number of stimulus/response interactions in the practice sub-block and in the test sub-block, the presentation of the stimuli in each stimulus/response interaction in the practice sub-block and test sub-block, the type of instruction regarding the concept-pair/response-key combinations, the number of stimulus/response interactions administered during instruction regarding the concept-pair/response-key combinations, and the nature and content of the introduction.

By way of example, many of the innovations applied to developing and administering an SAITA directed to preschool children are next described. These innovations illustrate the general principals of SAITA development and administration. FIG. 4 illustrates various innovations regarding input devices as well as stimulus and information presentation. As shown in FIG. 4, for preschool children, the standard computer keyboard is modified or replaced by a subject-appropriate input device 402. The subject-appropriate input device includes only two, very large keys or pads 404 and 406. The two keys, or pads, 404 and 406 have two different colors. As discussed further, below, the colors are chosen to be neutral, without introducing unnecessary conceptual dimensions to the SAITA. As one example, an SAITA directed to preschool children may be developed to test various gender-related hypotheses. Were the two input keys 404 and 406 colored blue and pink, the standard, social association of pink with girls and blue with boys would almost certainly introduce an unintended, third conceptual dimension to the SAITA.

Although any color may have unintended associations, for a particular SAITA, secondary colors orange, green, and purple tend to be generally most neutral for preschool children. For other categories of subjects, alternative types of input devices may be most effective. For people lacking use of arms, due to disabilities of birth defects, spoken responses detected by a microphone or directional orientation of the visual axis, detected by a video camera, may be appropriate. FIG. 4 includes depictions of audio speakers 408 and 410, in addition to the display device 412. The standard ITA relies purely on textual and graphical visual display of both tutorial information and the presentation of stimuli during stimulus/response interactions. However, modern personal computers and workstations are capable of playing music and sounds, and audio presentation proves to be useful, particularly for non-literate subjects.

The standard ITA relies on textual concept pairings during key-association instruction and tutorials. In the standard ITA, the words "flowers" and "pleasant" might be shown together, on the left portion of a screen, and the words "insects" and "unpleasant" might be shown on the right-hand portion of the screen, indicating that the left-hand key is associated with the concepts "flowers" and "pleasant," while the right-hand key is associated with "insects" and "unpleasant." This concept-pair/response-key combination presentation relies on a subject being able to read the words, and also relies on the subject being able to make mental associations between the display-screen positions of the word pairs representing concept pairs and the designated input keys on the keyboard. For preschool children, seeing and understanding the concept pairings and mentally establishing the concept-pair/response-key combinations by positions of displayed text is simply too formidable a task.

Figure 5:
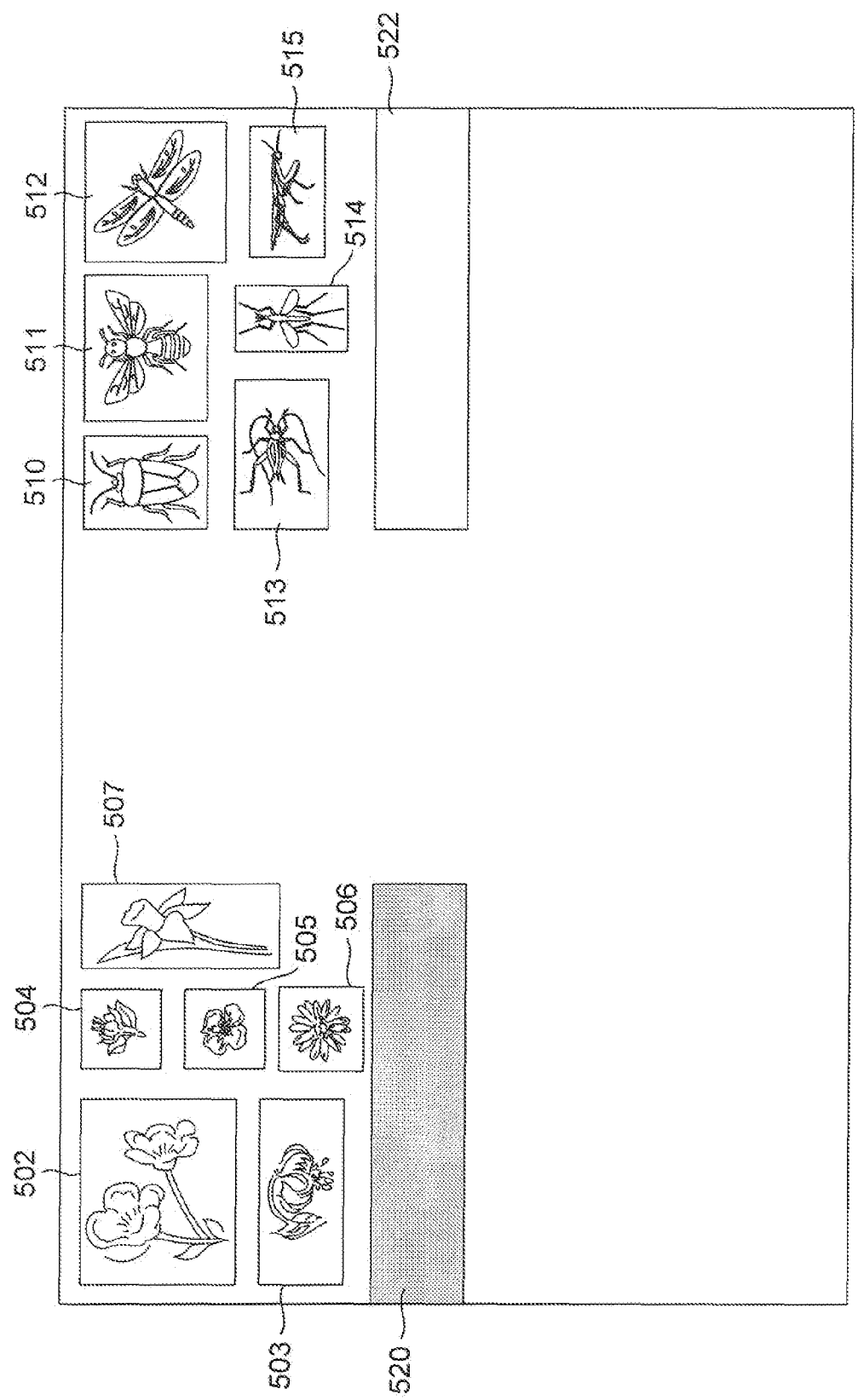
FIG. 5 illustrates a visually displayed screen that has been developed to test strengths of association tested by the standard ITA in FIGS. 1 A-F.

In an SAITA directed to preschool children, conveyance of the concept-pair/response-key combinations includes using colors and pictures, and matching input-key colors. FIG. 5 illustrates a visually displayed screen that has been developed to test strengths of association tested by the standard ITA in FIGS. 1A-F. Pictures representing flowers 502-507 are shown as a collage of all exemplars used to represent the category of flowers, above a colored band 520 having the same color as the left-hand input key (404 in FIG. 4). Similarly, pictures depicting insects 510-515 are shown as a collage of all exemplars used to represent the category insects above a second colored band 522 having the same color as the right-hand input key (406 in FIG. 4). Thus, the target-concept/response-key combinations are naturally and graphically presented in the visual display by matching of the input-key colors to colored bands 520 and 522 and the picture collages associated with the colored bands. Thus, in an SAITA, a specially tailored input device can be combined with matching visual-display features to facilitate a non-verbal imparting of the concept/response-key combinations in at least one conceptual dimension. Similar techniques may be used for the second conceptual dimension. For example, in the visual display shown visual display shown in FIG. 5, a collage of pictures depicting the affective dimension "pleasant" may be display below the colored bar 520, and a collage of pictures representing the emotion "unpleasant" may be displayed below the colored bar 522, so that the concept-pair/response-key combinations are displayed visually. Alternatively, one conceptual dimension may be visual, as in FIG. 5, and the second conceptual dimension may be provided by audio information presented during instruction regarding the concept-pair/response-key combinations. In this case, the subject may be trained by audio stimulus to depress the left-hand key when pleasant words are spoken and the right-hand key when unpleasant words are spoken. Various combinations of visual and audio presentation may be appropriate for different categories of subjects. For preschool children, it has been found that representing concept/response-key combinations related to a first conceptual dimension by visual means, and representing concept /response-key combinations related to a second conceptual dimension by audio means, may be most effective in conveying to the subject the concept-pair/response-key combinations that are to be employed by the subject during each block.

Figure 6:
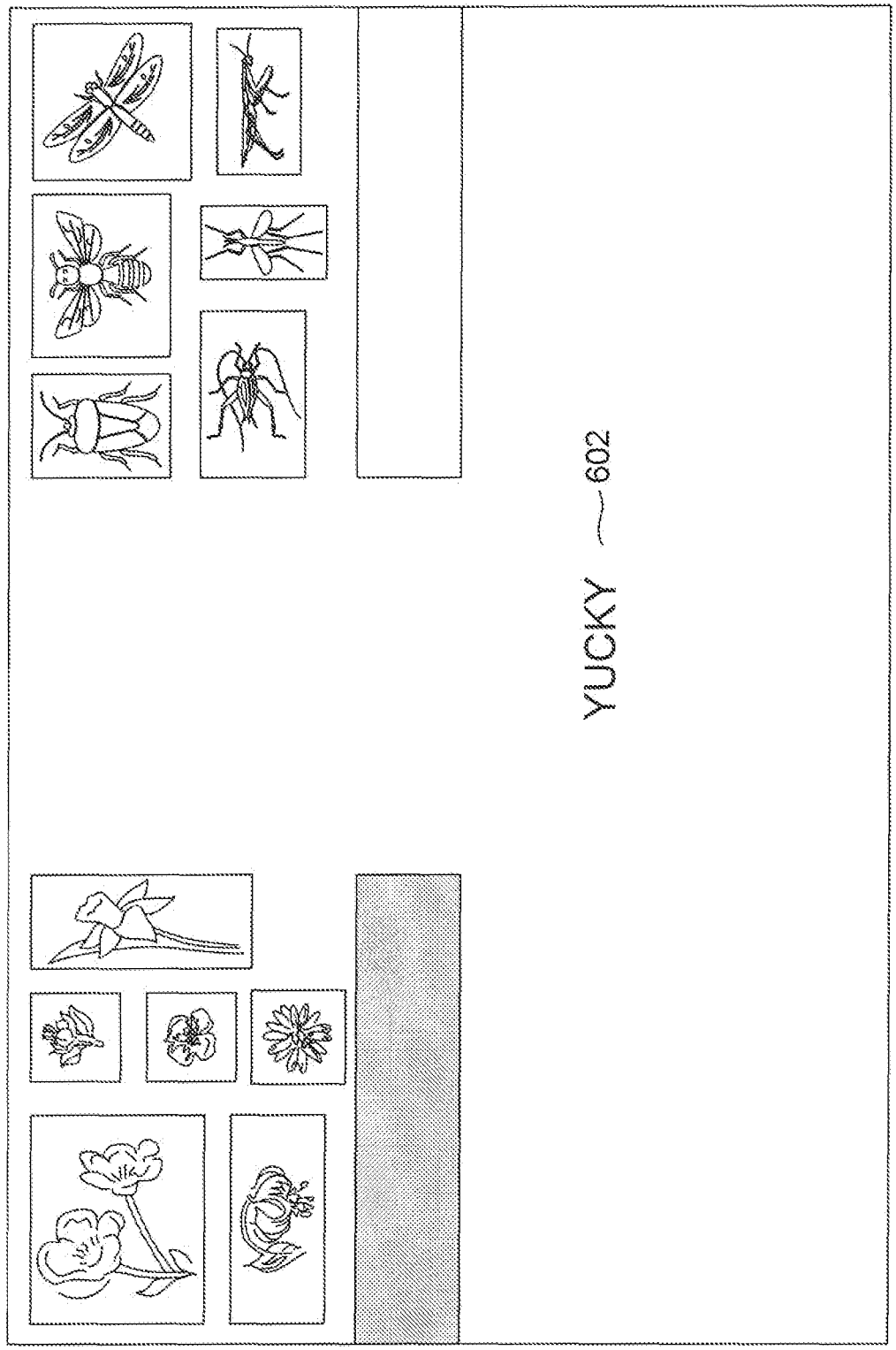
FIG. 6 illustrates a method of audio-stimulus presentation in an SAITA directed to preschool children.

FIG. 6 illustrates a method of audio-stimulus presentation in an SAITA directed to preschool children. As shown in FIG. 6, when an audio stimulus is provided, such as the spoken word "yucky," the word or phrase is also displayed visually on the display device 602. Visual display of the word or phrase indicates to the subject that a stimulus has been provided to which the subject needs to respond. In addition, even subjects who have not learned to read may recognize the forms of words or phrases, and thus visual display of the words or phrases may facilitate subjects' understanding of the responses requested during administration of the ITA. In addition to displaying the word or phrase, the word or phrase is generally spoken in a way that reinforces the meaning of the word or phrase. For example, using the test discussed with reference to FIGS. 1A-F, unpleasant words and phrases, such as "yucky," may be enunciated dramatically in negative tones, while pleasant words and phrases, such as "ice cream," may be enunciated in positive, happy tones. Achieving the needed enunciations requires careful preparation of both speakers and recording engineers who record them. It is not the point of an SAITA to challenge subjects with regard to understanding presented stimulus or assigning stimuli to categories. Inferences based on response latencies are most accurate when the stimuli are readily received and understood by subjects. The critical latency is the latency involved in deciding which of the two input keys to depress once the presented stimulus is understood and mentally assigned to the appropriate concept.

Figure 7:
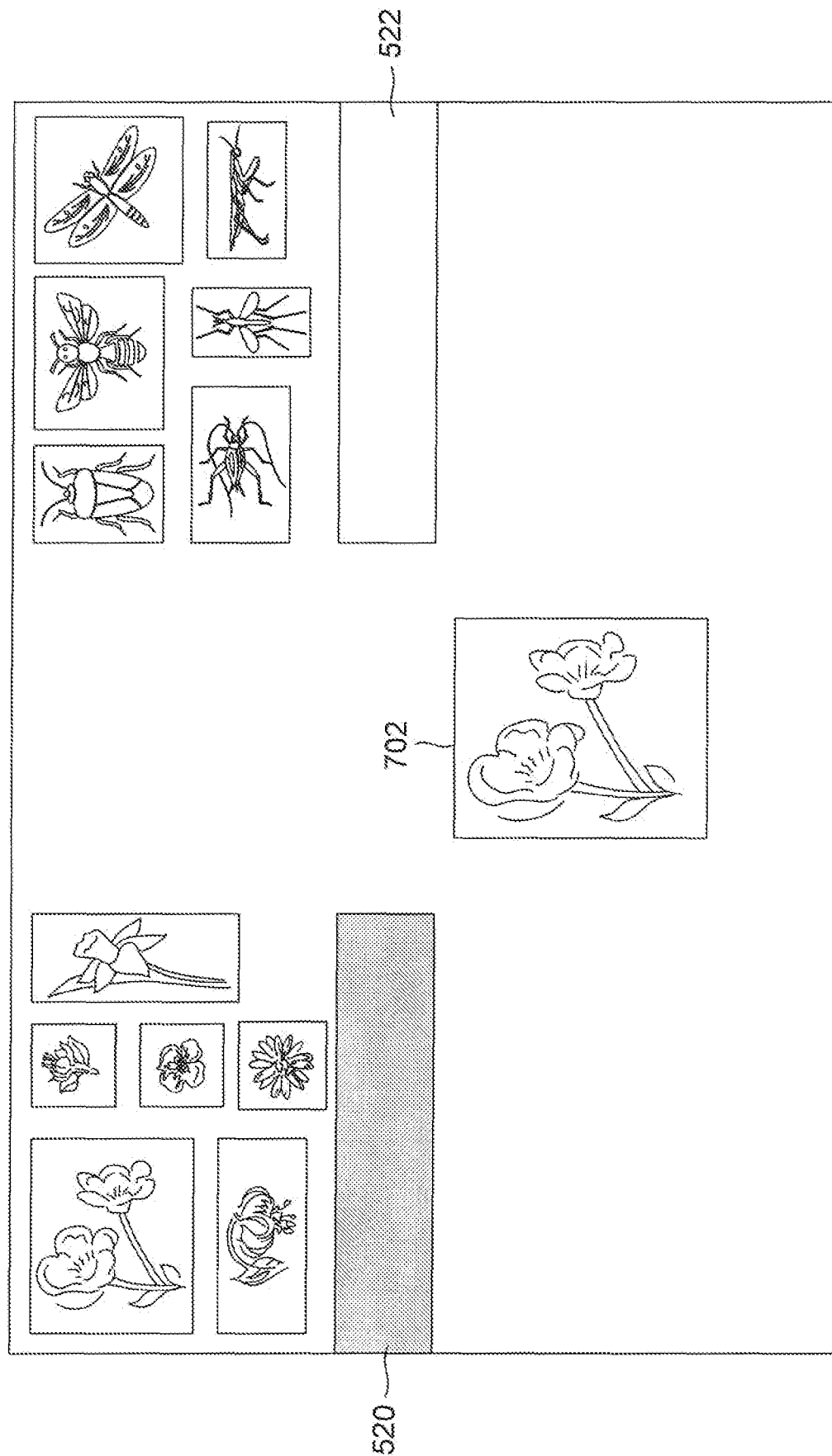
FIG. 7 illustrates presentation of a visual stimulus in an SAITA directed to preschool children.

FIG. 7 illustrates presentation of a visual stimulus in an SAITA directed to preschool children. When a visual stimulus 702 is presented, the SAITA simultaneously provides an audio tone, such as a beep or musical note, to reinforce to the subject the need to respond by depressing an input key. Thus, there is symmetry between audio presentation of stimuli and visual presentation of stimuli. In both cases, both a sound and a visual stimulus are simultaneously presented to the subject. In the SAITA, the pictures in the collages above the horizontal bars 520 and 522 are the same pictures used as visual stimuli during the SAITA blocks. This further facilitates identification, by the subject, of the displayed visual stimulus and concept to which the visual stimulus belongs.

Figure 8:
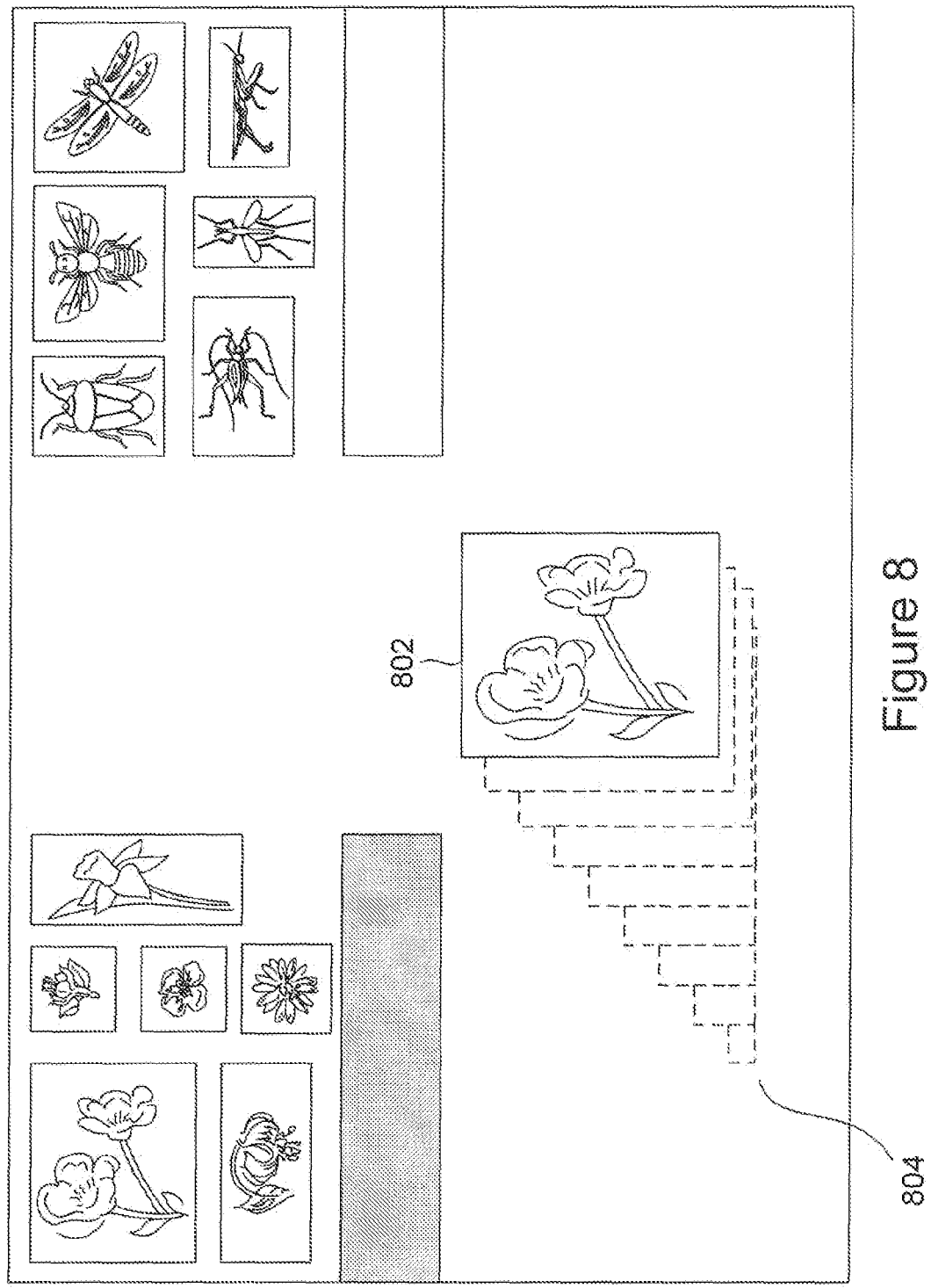
FIG. 8 illustrates an additional aspect of visual presentation of stimuli in an SAITA directed to preschool children.

FIG. 8 illustrates an additional aspect of visual presentation of stimuli in an SAITA directed to preschool children. As discussed above, subjects are encouraged to rapidly respond to stimuli. The more rapid the response, the greater the probability that differences in response times reflect an underlying association of concepts at an unconscious level. As a test subject rapidly responds to presented stimuli, the test subject may be confused as to whether depression of a key responds to the currently displayed stimulus, or instead elicits a next stimulus. In one example SAITA, as shown in FIG. 8, when the subject responds to a currently presented stimulus 802, the visual representation of the stimulus diminishes in size and moves off to one side of the visual display 804, to indicate that, by depressing the key, the user has responded to, and removed, the currently displayed visual stimulus. Such animation clues help subjects maintain the appropriate rhythm in responding to visually and audibly presented stimuli, and prevent inadvertent and unwanted latencies that may otherwise arise when a subject becomes confused as to what effect is elicited by input to the input keys during administration of an SAITA block.

Figure 9A:
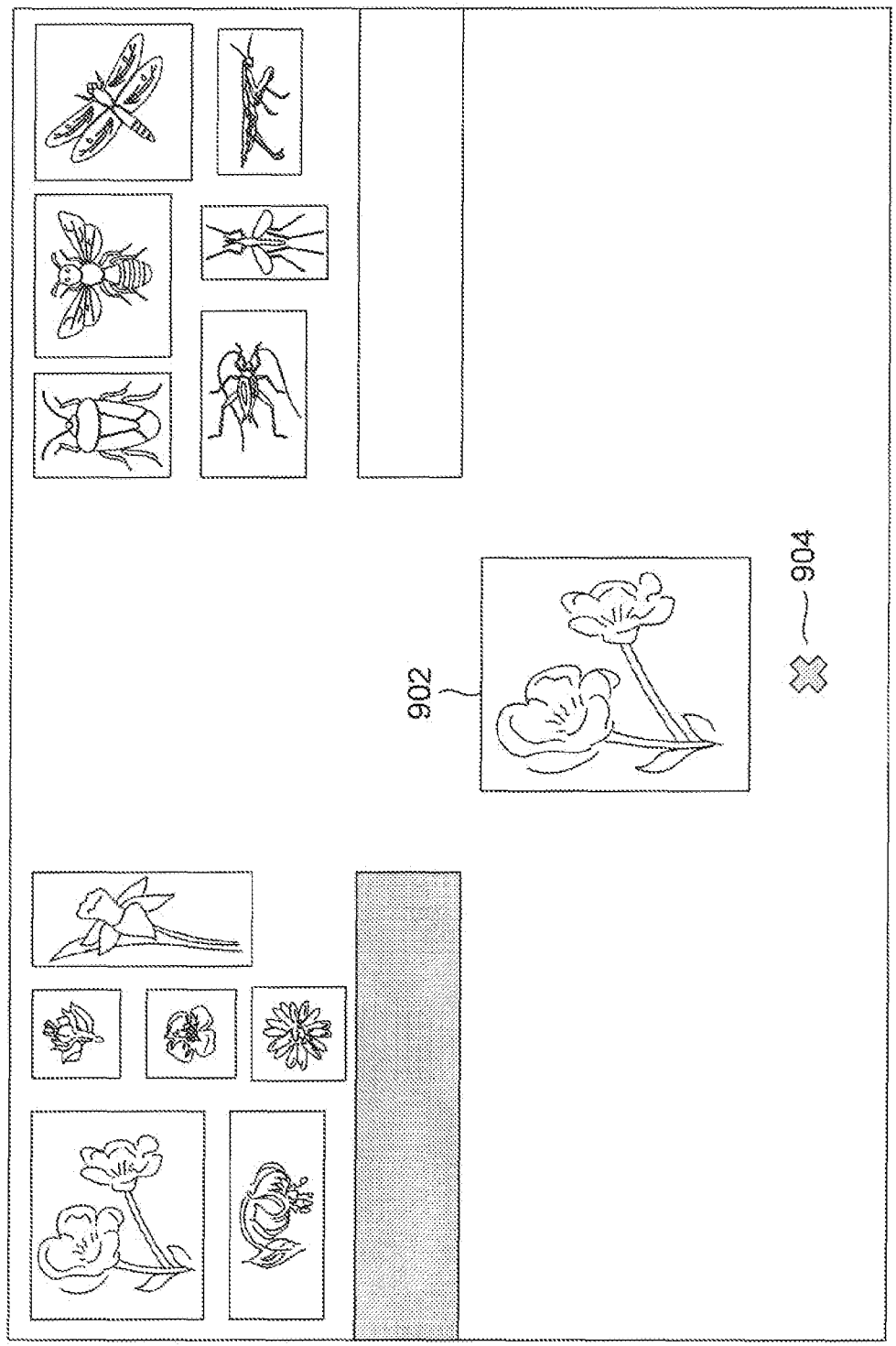
FIGS. 9A-B illustrate an additional aspect of the SAITA directed to preschool children.
Figure 9B:
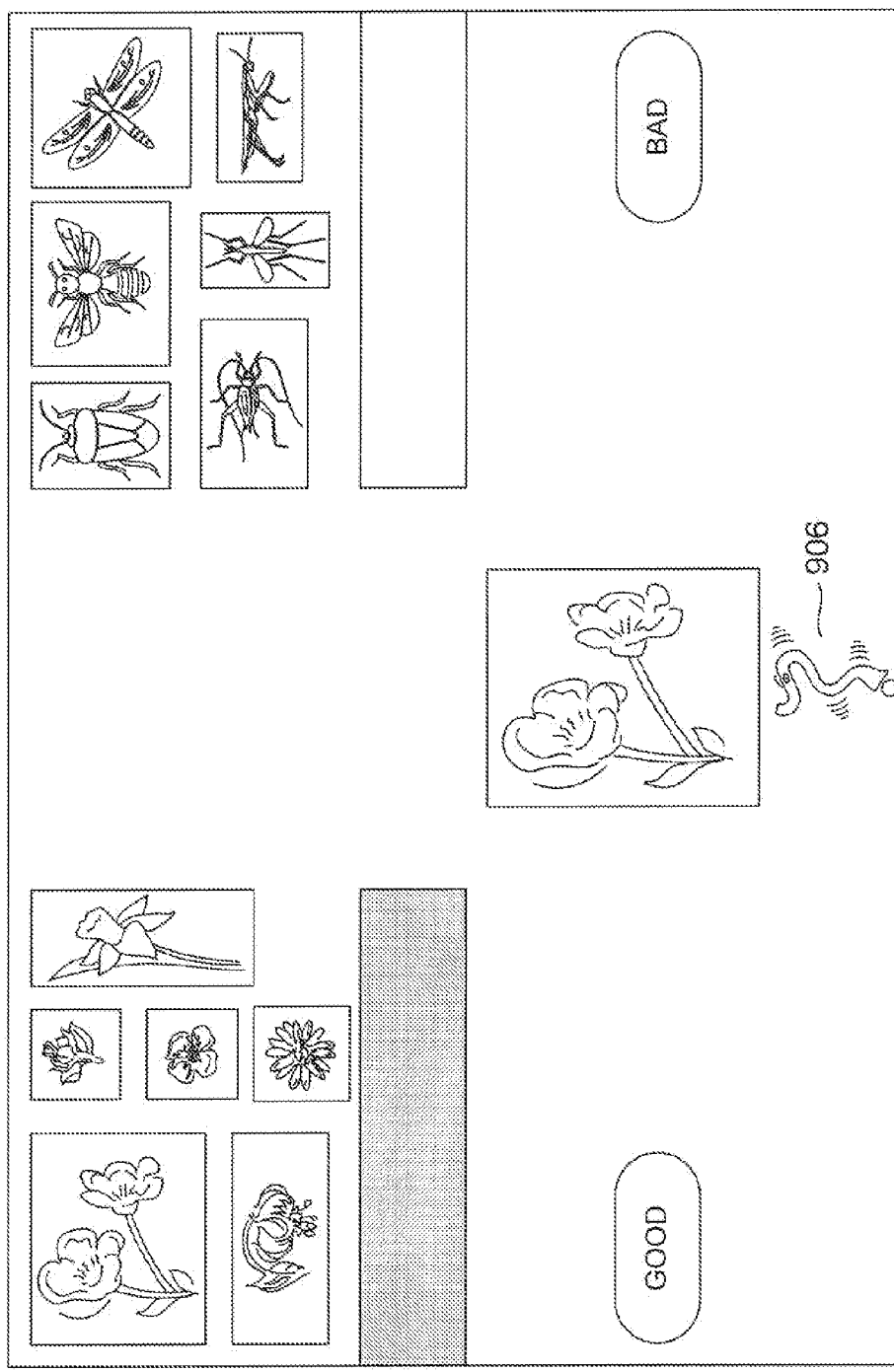

FIGS. 9A-B illustrate an additional aspect of the SAITA directed to preschool children. As shown in FIG. 9A, when a subject incorrectly responds to a visual stimulus, such as depressing the right-hand input key, currently associated with the insects when presented with the flower visual stimulus 902, the standard ITA displays a red "X" symbol 904 to indicate an incorrect response. While acceptable to adult subjects, such incorrect-response feedback may be disconcerting or troubling to preschool subjects. As shown in FIG. 9B, in the SAITA directed to preschool children, rather than displaying a red "X" symbol, as displayed by the standard ITA, a wiggling question mark 906 is displayed, and the computer proctor, or a human proctor, explains with a phrase such as: "The computer did not understand. Please try again." Such neutral feedback maintains a positive attitude of the subject which, in turn, facilitates subject tolerance for continued stimulus/response interactions.

For the SAITA directed to preschool children, stimuli directed to the first conceptual dimension, such as the target concepts {flowers, insects} in the exemplary test of FIGS. 1A-F and 5-9B, are always presented visually, as displayed pictures, while stimuli directed to the second conceptual dimension, such as the attribute concepts {pleasant, unpleasant}, are presented in an audio medium, such as by recorded enunciation of a word or phrase. In this way, the key assignments are reinforced and simplified, so that the test subject can more easily mentally categorize presented stimuli. In alternative types of SAITA, alternative types of mappings between stimulus categories and stimulus presentations may be used to facilitate mental categorization.

Figure 10:
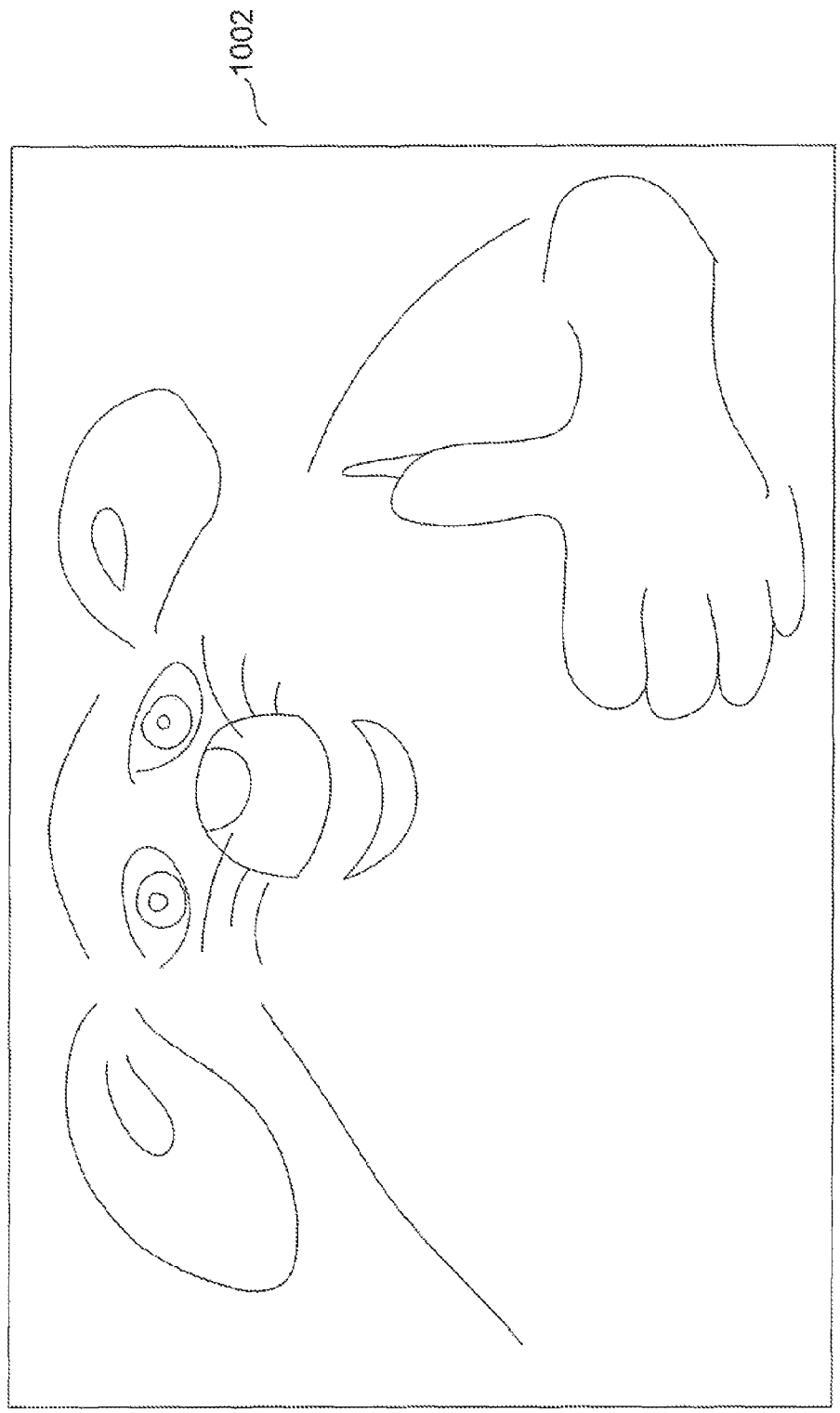
FIG. 10 illustrates an additional aspect of the SAITA directed to preschool children.

FIG. 10 illustrates an additional aspect of the SAITA directed to preschool children. For preschool children, positive feedback is critical in maintaining a continued engagement of the subject with the SAITA. A positive-feedback display 1002 is therefore displayed at various points during the SAITA to encourage the test subject to continue with the SAITA and to facilitate a continued positive attitude of the subject towards the SAITA, despite problems that the subject may experience during administration of the SAITA. For example, a positive feedback screen may be displayed at intervals during key-association training and during each block of the SAITA. In addition, when subject inattention or fatigue is detected, either by a human test administrator or automatically by SAITA routines running on the computer, a positive feedback screen may be provided or the subject may be invited to spend time in a play area both as a mental break and to encourage the subject to remain attentive during the SAITA.

Figure 11:
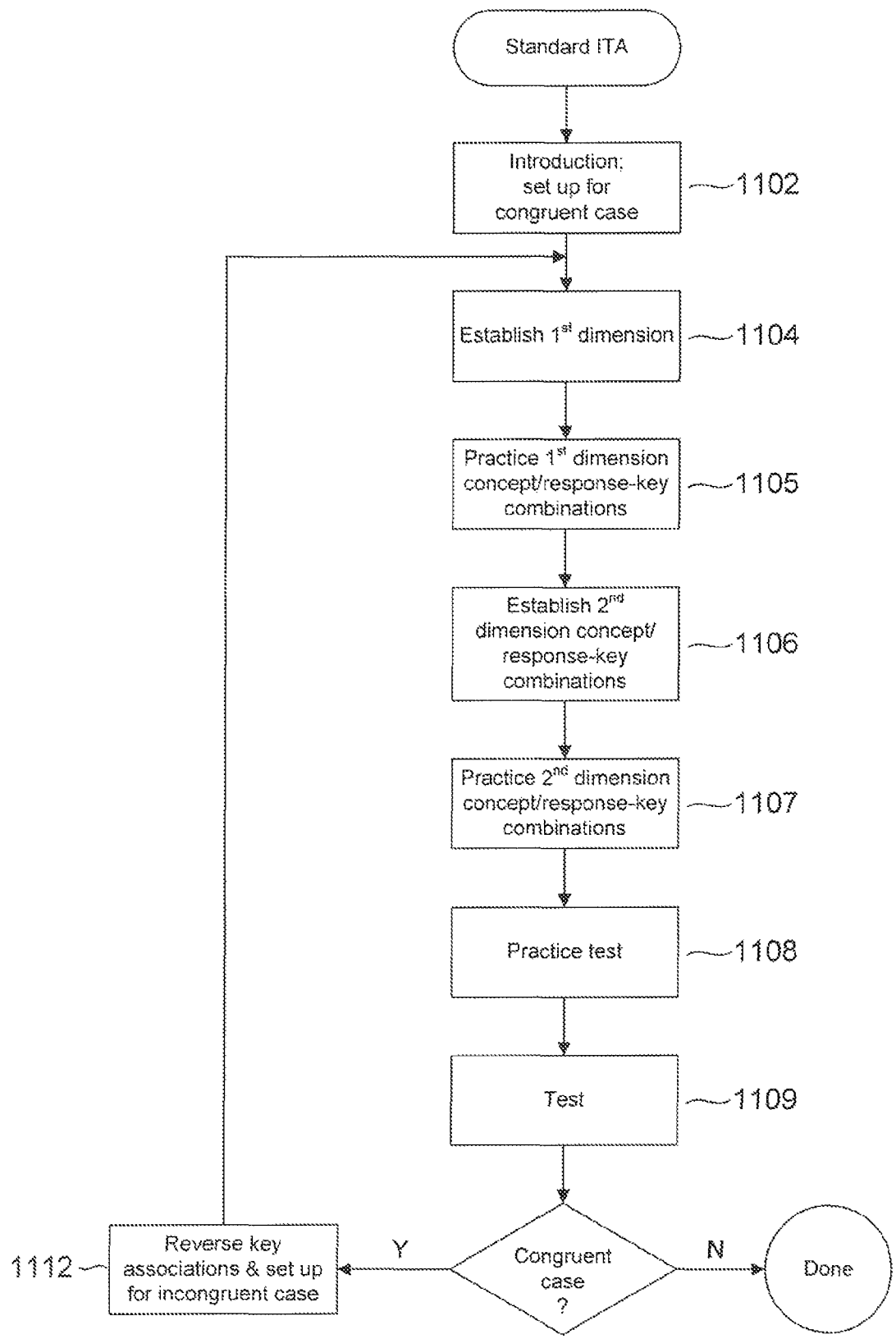
FIG. 11 illustrates the standard ITA as a control-flow diagram.

FIG. 11 illustrates the standard ITA as a control-flow diagram. The

ITA is introduced and explained, and the routines that implement the standard ITA are configured for the congruent block, in a first step 1102. Then, each of steps 1104-1109 are carried out for each block of the standard ITA, generally for two blocks representing the congruent and incongruent cases for a particular concept-association hypothesis. In step 1104, pictorial information is provided visually to the subject to establish concept/response-key combinations used in the first conceptual dimension. In step 1105, a series of stimulus/response interactions are administered to practice the target-concept/response-key combinations. In steps 1106 and 1107, the attribute-concept/response-key combinations are established, and stimulus/response interactions are then administered to practice the target-concept/response-key combinations. In step 1108, a practice ITA sub-block is administered, as a series of stimulus/response interactions, assuming the concept-pair/response-key combinations established in steps 1104-1107. Then an actual ITA sub-block, comprising a series of stimulus/response interactions, is administered in step 1109. After the congruent case is administered, the target-concept/response-key combinations or attribute-concept/response-key combinations are internally reversed and the routines that implement the standard ITA configured for the incongruent case, in step 1112. The standard ITA generally employs a fixed number of stimulus/response interactions for concept-pair/response-key combination reinforcement, each practice sub-block, and the test sub-block. The standard ITA, as discussed above, generally employs only visual stimulus presentation and generally does not monitor latencies during test administration to detect problems, including lagging attention, misunderstood instructions, or other problems that may arise.

FIGS. 12-17 illustrate a general SAITA using the control-flow-diagram illustration method employed in FIG. 11 to illustrate the standard ITA. It should be noted that many steps can be carried out either by a human test administrator, by software routines that automate portions of test administration, of by both a human test administrator and software routines. There are many alternative approaches and examples. For example, particular tasks and sub-tasks may be carried out at different levels in different approaches and examples. Monitoring for subject fatigue, for example, may be carried out at the sub-block level, within each block of an SAITA, or may alternatively be carried out at the block level. Thus, the described example represents only one approach, and many alternative approaches are possible in which the level at which tasks are carried out and features provided is altered, certain tasks and/or features are omitted, additional tasks and/or features are added.

In step 1202, a subject-appropriate introduction to the test is provided. Subject-appropriate introduction may include certain types of positive stimulus, to engage the subject. For example, visual displays may employ certain types of colors that are found to be conducive to attracting the subject's attention and encouraging cooperation. Audio stimuli, including attractive music or other attention-attracting and positive-response-inducing stimuli may be presented. For certain categories of subjects, human administration may be important, rather than relying solely on automated administration of the SAITA through a computer interface. For the SAITA directed to preschool children, a human administrator is always present, to add explanations, monitor the test subject's attitude, performance, and understanding of test procedures, and to provide positive feedback. Test goals, general test procedures, and other aspects of the SAITA may be described in subject-appropriate manners, using examples, words, images, and other presentations of information appropriate to the category of subject. In step 1204, the internal routines are configured for the congruent case. In step 1206, a subject-appropriate concept-pair/response-key-combination training with monitoring is invoked in order to establish the concept-pair/response-key-combinations used in the current block of the test. If problems are detected, as determined in step 1208, then various ameliorative operations may be carried out in step 1210. For example, additional instruction may be necessary, or a break with toys and other recreational activities may be needed, in the case of preschool children. In the case of disabled subjects, attention may need to be paid to various input procedures and information displays to ensure that the disabled subject disabled subject can properly receive and respond to presented information and stimuli. Next, in step 1212, a subject-appropriate test sub-block with monitoring is administered. After administration of the test sub-block, any problems that are detected, in step 1214, may be ameliorated in an additional amelioration step 1216. The internal routines are reconfigured for the incongruent case, in step 1218, and concept-pair/response-key-combination training and test administration are carried out for the incongruent block by repeating steps 1206, 1208, 1210, 1212, 1214, and 1216. Finally, results are computed and feedback is provided, in step 1220.

Figure 12:
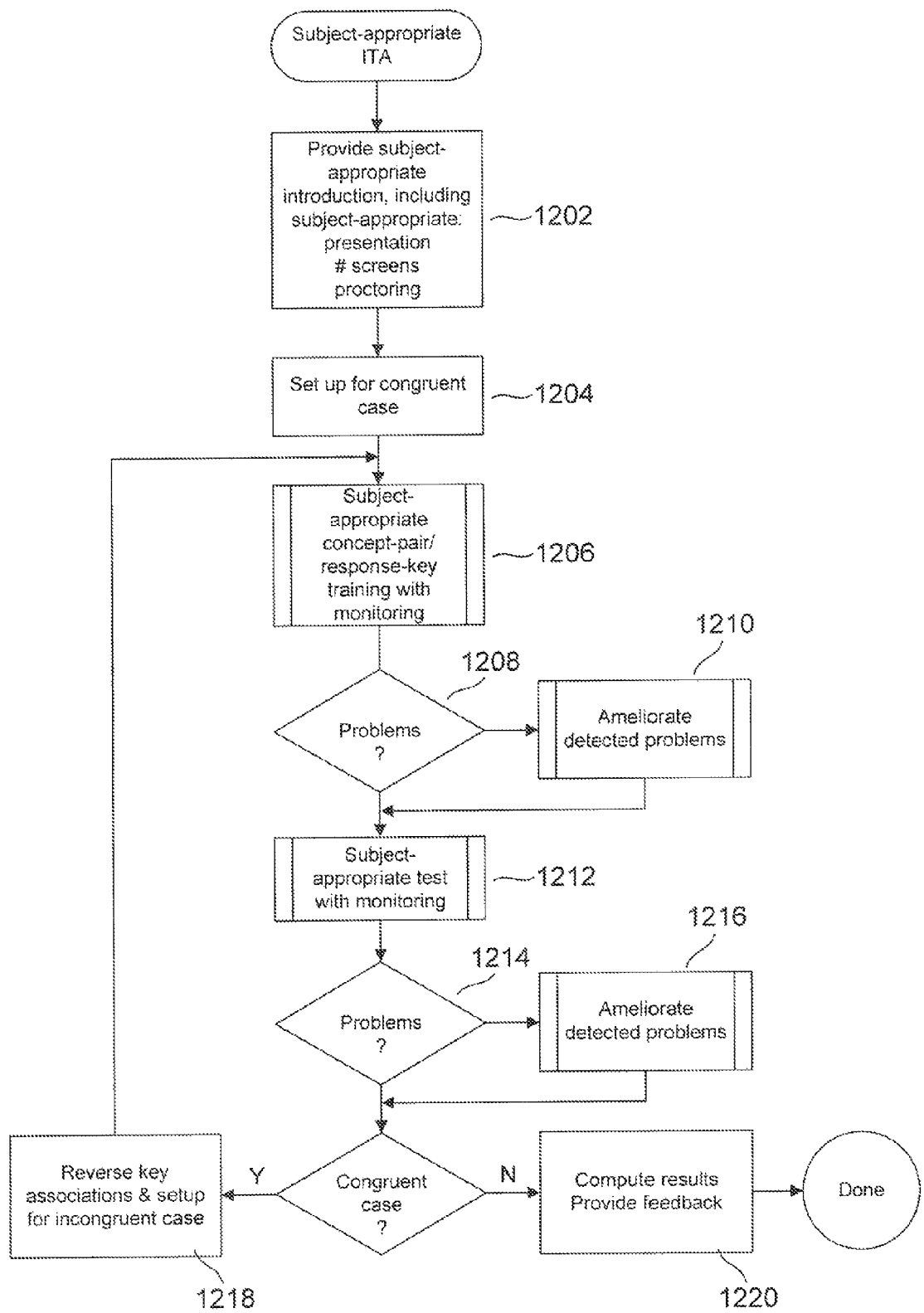
FIGS. 12-17 illustrate a general SAITA using the control-flow-diagram illustration method employed in FIG. 11 to illustrate the standard ITA.
Figure 13:
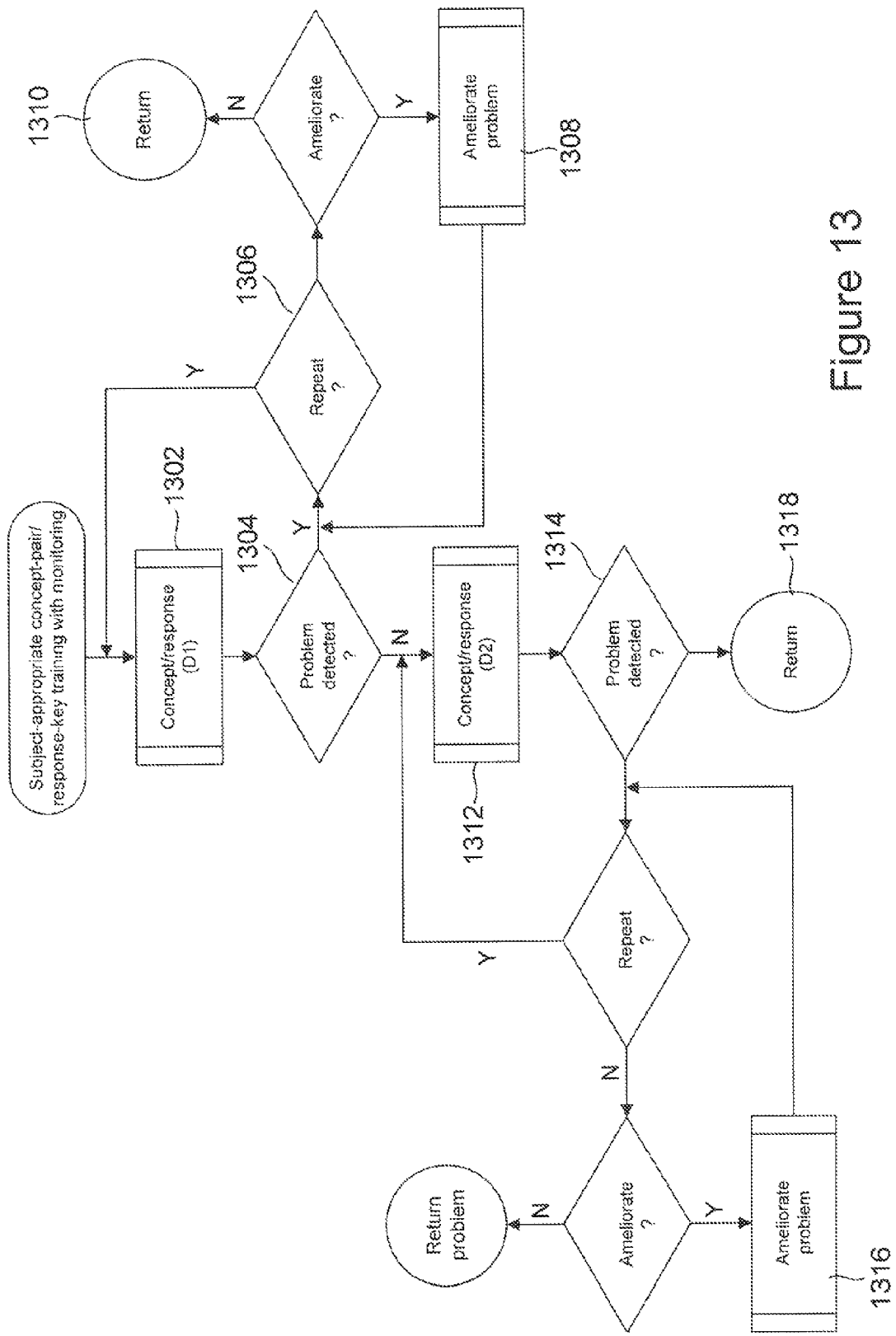

FIG. 13 illustrates the subject-appropriate concept-pair/response-key combinations training with monitoring routine called in step 1206 of FIG. 12. In step 1302, a concept/response routine is called with respect to the target-concept/response-key combinations used in the current block of the test. If any problems are detected in step 1304, the target-concept/response-key-combination training may be repeated, as determined in step 1306, or problems may be ameliorated by additional procedures, in step 1308. When problems cannot be detected at the current level, a problem indication is returned in step 1310. Similarly, the concept/response routine is called, in step 1312, to establish attribute-concept/response-key combinations used in the current block of the test. Again, when problems are detected, in step 1314, the attribute-concept/response-key-combination training is either repeated or problems are ameliorated, in step 1316. When the concept-pair/response-key training is completed with all the problems addressed, and no problems remaining, then the routine returns with a "no problem" indication in step 1318.

Figure 14:
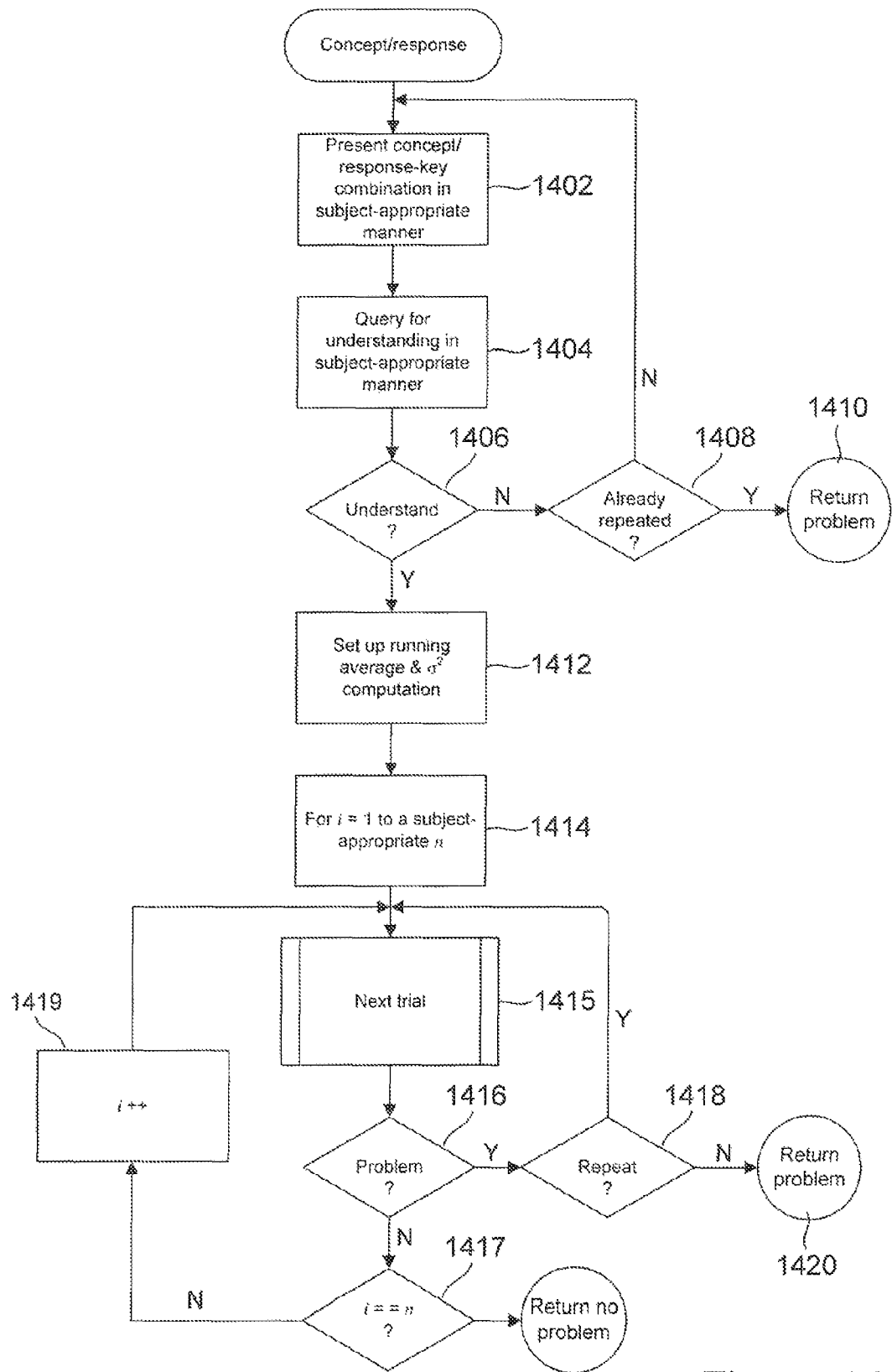

FIG. 14 illustrates the concept/response routine called in steps 1302 and 1312 of FIG. 13. In step 1402, concept-pair/response-key training is presented in a subject-appropriate manner. For example, in an SAITA directed to preschool children, the concept-pair/response-key training may be presented using color-associated collages of pictures, as described above with reference to FIG. 5. Alternatively, concept-pair/response-key training may be described by a human administrator or by audio statements with visual indications displayed on the computer display. In step 1404, either a human administrator or the automated system queries the subject to determine whether the subject has understood the presented concept-pair/response-key combinations, in step 1402. When the subject matter has not been understood, as determined in step 1406, then the presentation may be repeated or, when already repeated, an error may be returned in step 1410. When the concept-pair/response-key combinations have been understood, then the internal routines set up a running average and running variance computation, in step 1412. Then, in a for-loop comprising steps 1414-1419, a number of stimulus/response trials are carried out to allow the subject to practice using the concept-pair/response-key combinations. Note that the number of trials n is selected to be appropriate for the category of subjects being tested. In step 1415, the routine "next trial" is invoked in order to carry out the next stimulus/response interaction. If problems are detected, as determined in step 1416, then the trial may be repeated, as determined in step 1418, or a problem indication may be returned in step 1420.

Figure 15:
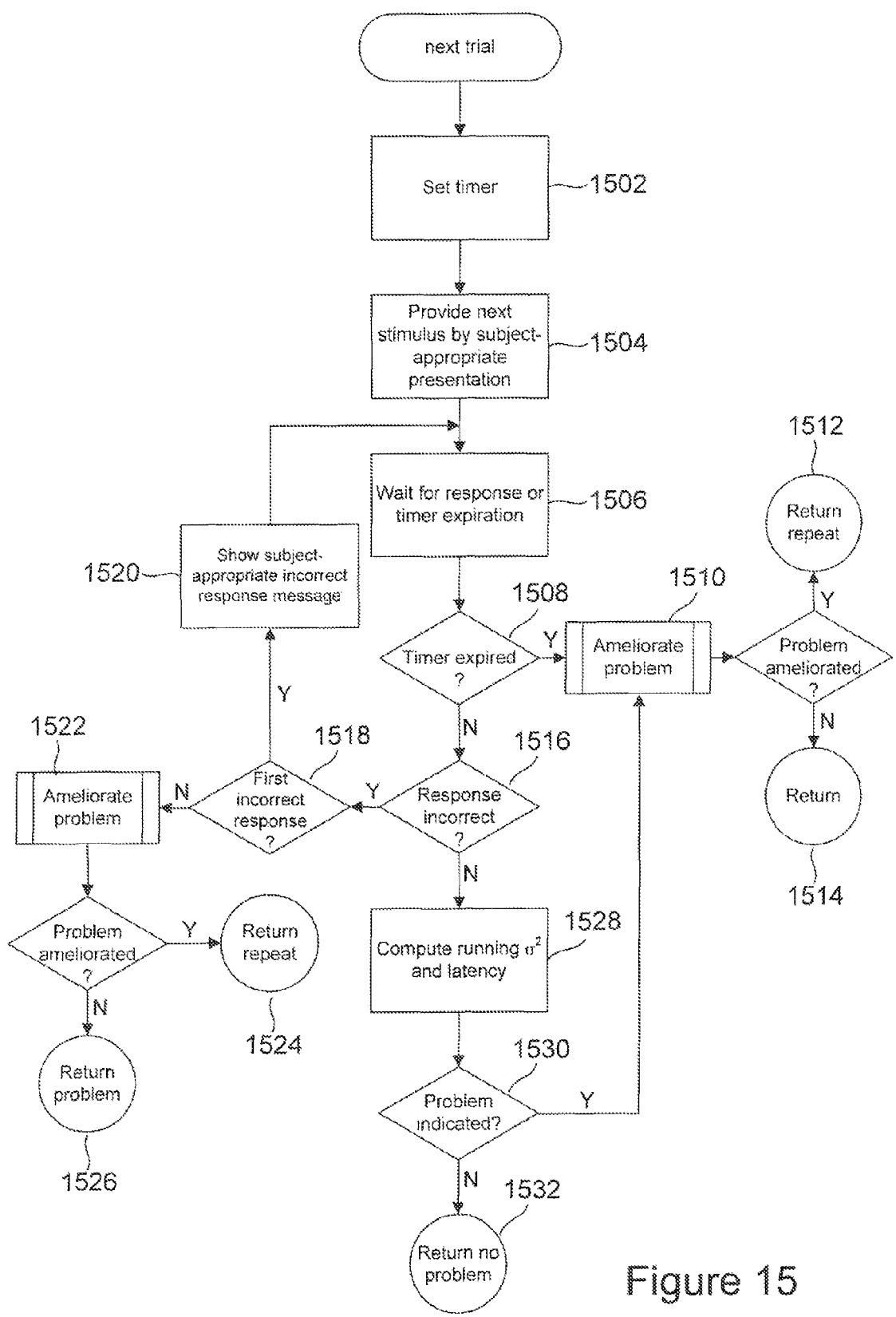
Figure 17:
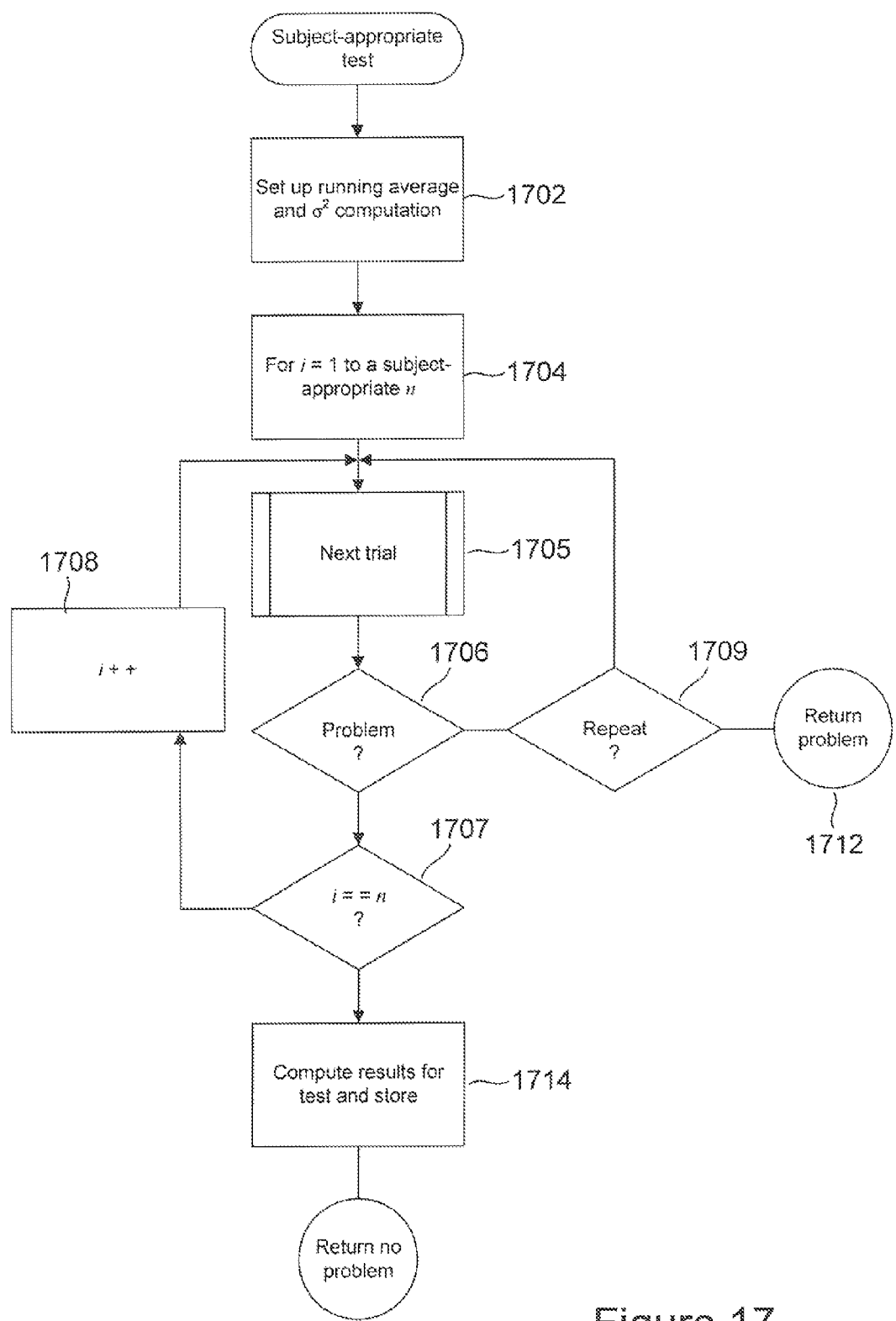

FIG. 15 illustrates the routine "next trial" called in step 1415 in FIG. 14 and also called in step 1705 of FIG. 17. In step 1502, a timer is set. Then, in step 1504, the stimulus for the trial is presented to the subject in a subject-appropriate presentation. For example, as discussed above, in a preschool SAITA, a visually presented stimulus may be accompanied by an audio tone, and an audio-presented stimulus may be accompanied by a visually presented word or phrase. Then, in step 1506, the routine waits for a response from the subject or for timer expiration. If the timer has expired, as determined in step 1508, then the subject has failed to respond to the stimulus in a reasonable amount of time. In that case, various operations are undertaken to handle the problem, in step 1510 and either an indication that the step should be repeated is returned in step 1512 or a problem indication is returned in step 1514. Timer expiration is tailored to the category of subjects to which an SAITA is directed. A much larger response window may be allowed for preschool children, for example, than for adults, reflecting the longer latencies expected for preschool children. When the timer hasn't expired, the routine next determines, in step 1516, whether the response is correct or incorrect. If the response is incorrect, then if the response is the first incorrect response, as determined in step 1518, then a subject-appropriate incorrect-response message is presented, in step 1520, either by the computer or by a human test administrator. Control then flows back to step 1506 to wait for the subject to properly respond to the stimulus. If the subject has incorrectly responded previously, then the problem is attempted to be ameliorated in step 1522. Either an indication to repeat the step is returned, in step 1524, or a problem indication is returned in step 1526. When the response is correct, the running variance and latency for the response are computed in step 1528. If either the currently computed variance for responses or the latency for the current response indicates a problem, as determined in step 1530, then problem amelioration may he carried out in step 1510. When no problems have occurred, or all problems handled, then a "no problem" indication is returned in step 1532. When the computed running variance passes a threshold value, the subject may have tired or lost interest in the test, requiring the administrator to provide the subject with a break, again explain the purpose of the test, or carry out some other such ameliorative procedure. In certain cases, it may be prudent to discontinue the test due to inability of the subject to continue.

Figure 16:
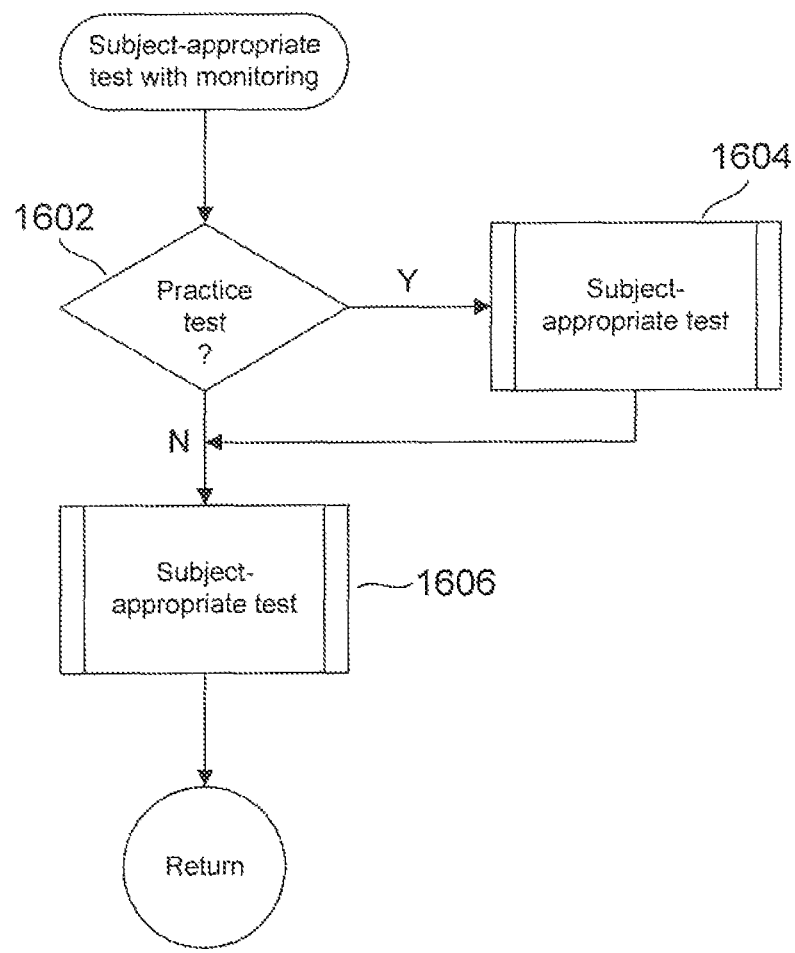

FIG. 16 shows a control-flow representation of the routine "subject-appropriate test with monitoring" called in step

1212 of FIG. 12. If a practice test is appropriate for the subject, as determined in step 1602, then the routine "subject-appropriate test" is called in step 1604 to administer the practice test. Otherwise, the routine "subject-appropriate test" is called in step 1606 to administer the actual test. In one SAITA developed for preschool children, the practice test sub-block and test sub-block are merged, or the distinction between practice session and actual test are blurred, to avoid confusing subjects.

FIG. 17 shows an illustration of the routine "subject-appropriate test" called in steps 1604 and 1606 of FIG. 16. First, a running average and running variance computation are initialized, in step 1702. Then, in a for-loop comprising steps 1704-1709, each stimulus/response interaction of a subject-appropriate number n of stimulus/response interactions is carried out. Any detected problems, in step 1706, are handled by either repeating the trial, as determined in step 1709, or returning a problem indication in step 1712. Finally, in step 1714, results for the test are computed and stored, to facilitate final result computation and feedback provision in step 1220 in FIG. 12. The number of stimulus/response interactions is selected to be appropriate for the category of test subjects to which the test is directed. While, for example, adults may be administered 20 stimulus/response interactions, a preschool child, for example, may need to complete 30 or more stimulus/response interactions, for example.

Figure 18:
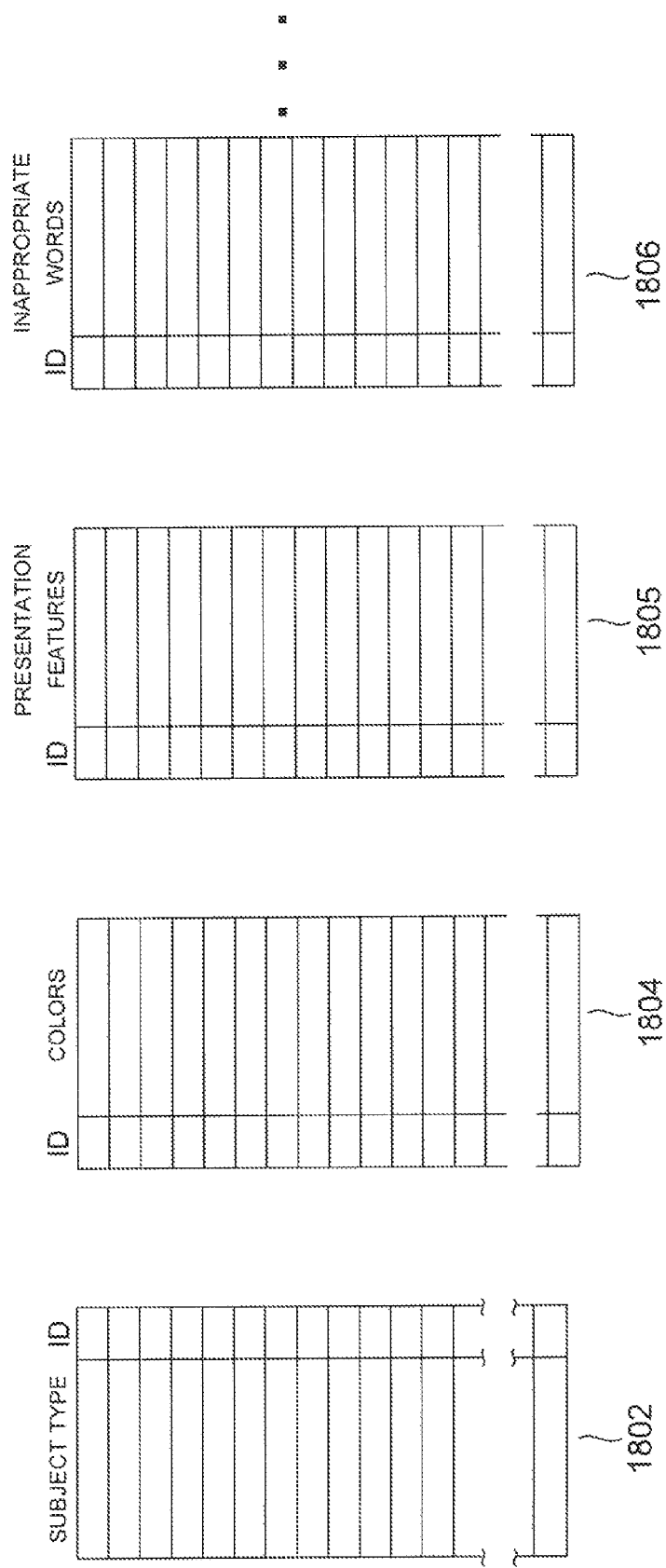
FIG. 18 illustrates various types of information that may be employed to facilitate development of SAITAs.

In developing SAITAs, collected information may be employed in order to design appropriate presentation and administration of the SAITA for a particular category of subjects. FIG. 18 illustrates various types of information that may be employed to facilitate development of SAITAs. For example, a subject table 1802 may associate each category of subject with a subject ID. Subject IDs may be then used to indicate those aspects and features appropriate for that category of subject in various additional tables 1804-1806, and other tables not shown in FIG. 18. For example, subject-appropriate colors may be listed in a colors table 1804. As another example, subject-appropriate presentation features may be listed in a presentation-features table 1805. Presentation features may include types of stimulus presentation, visual and audio cues employed during tutorials and stimulus/response interactions, and other such features. Various tables, such as table 1806, may act as filters during design of tests. Table 1806 includes words that are inappropriate for particular categories of subjects. Filters may be established for visual images, audio signals, and colors. Of course, far more complex database schemas may be designed for efficiently storing subject-appropriate parameters, features, and filters. As one example, a subject may be initially interviewed, and pictures of the subject and the subject's possessions or commonly used items taken, for subsequent use as stimuli during a later-administered ITA.

Figure 19:
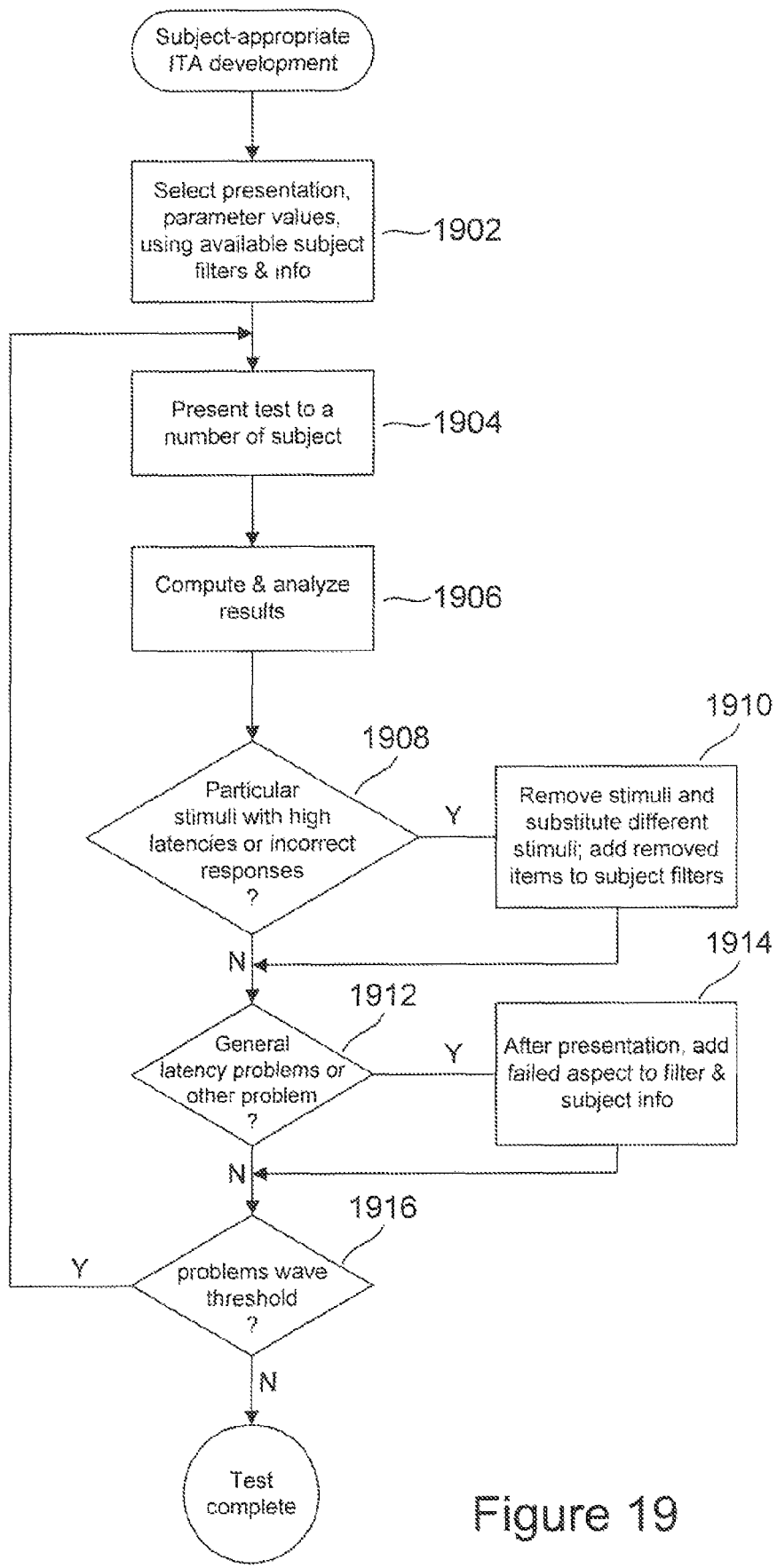
FIG. 19 illustrates, in control-flow fashion, the design and methodology for designing SAITAs.
Figure 20A:
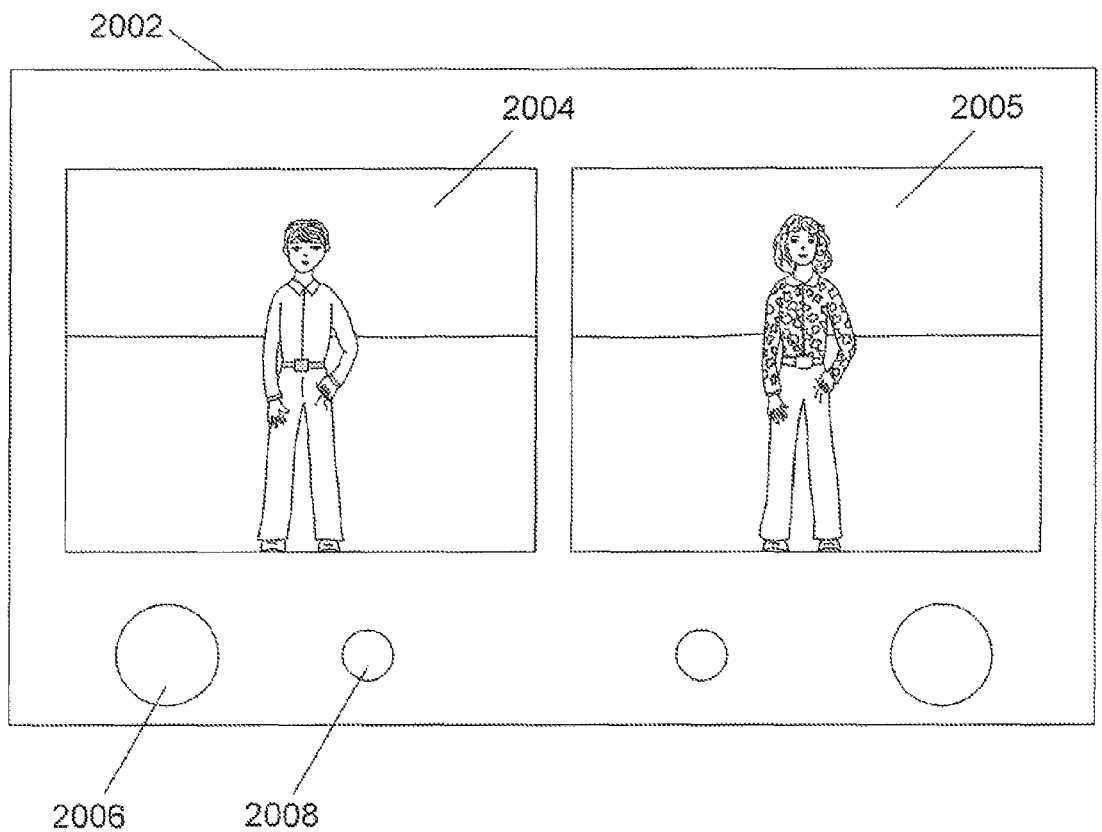
FIGS. 20A-F illustrate an example of a subject-appropriate Likert-type testing method that solicits explicit responses from subjects related to gender and math skills.
Figure 20B:
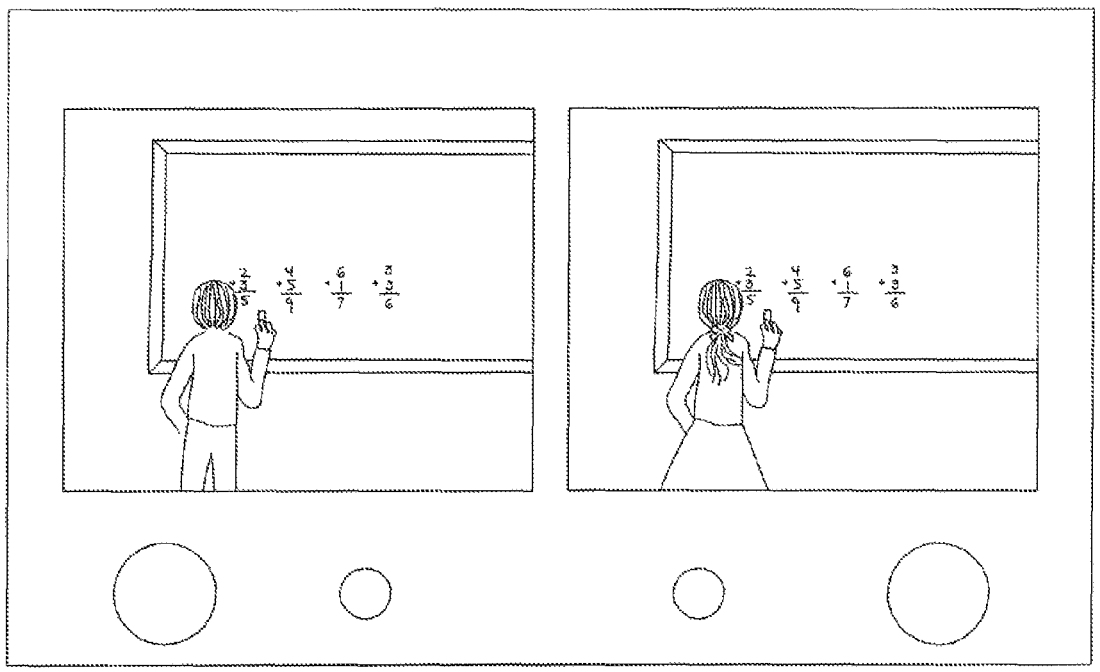
Figure 20C:
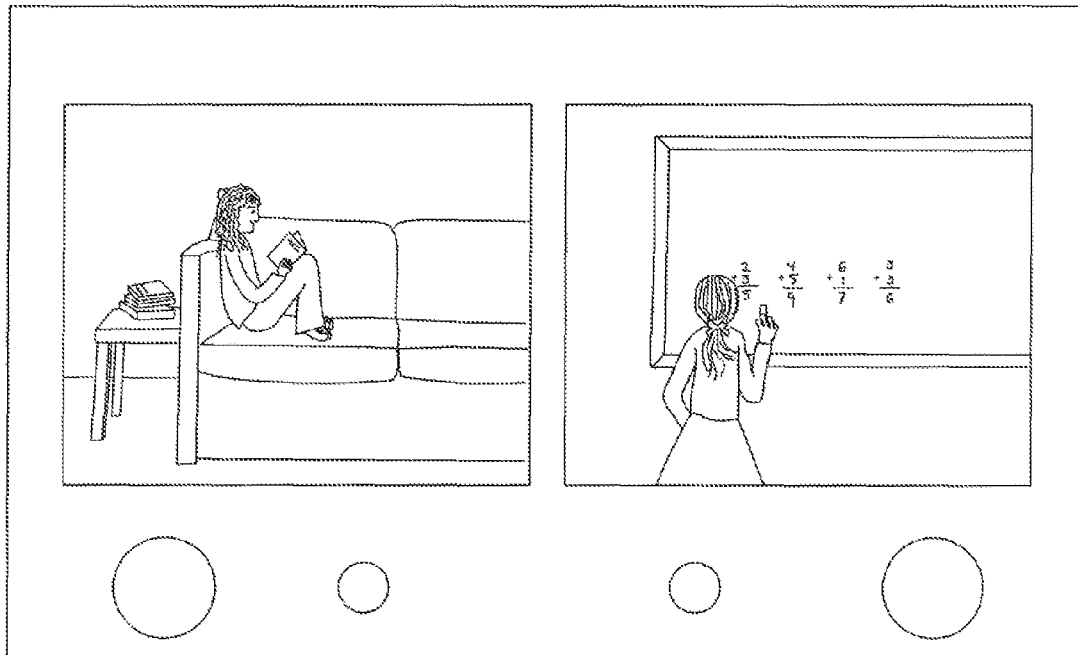
Figure 20D:
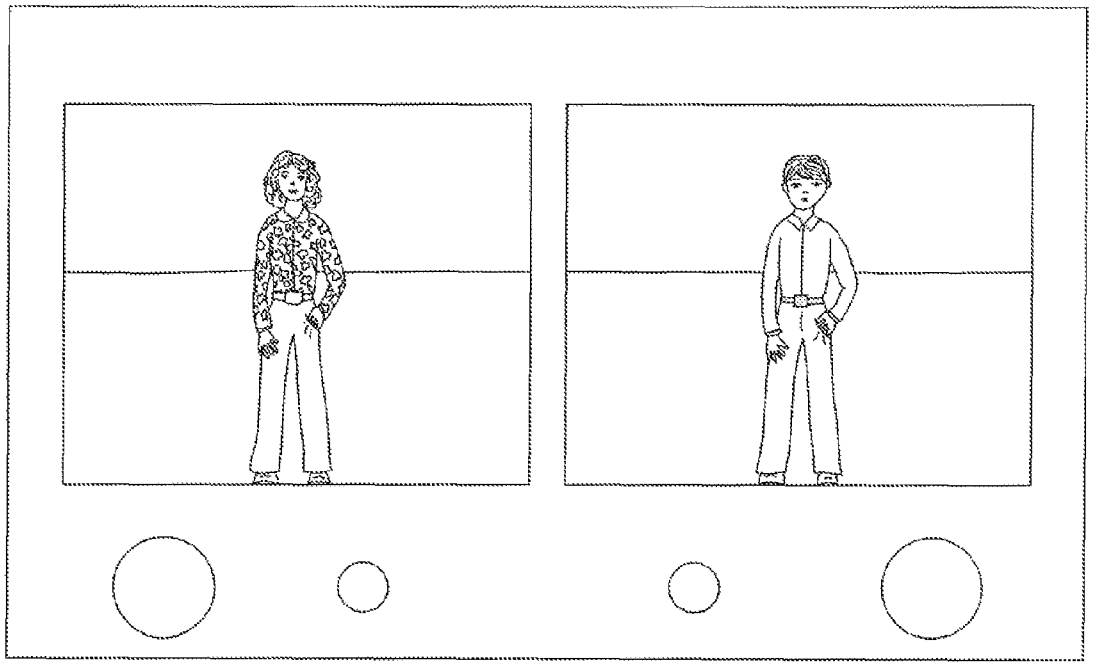
Figure 20E:
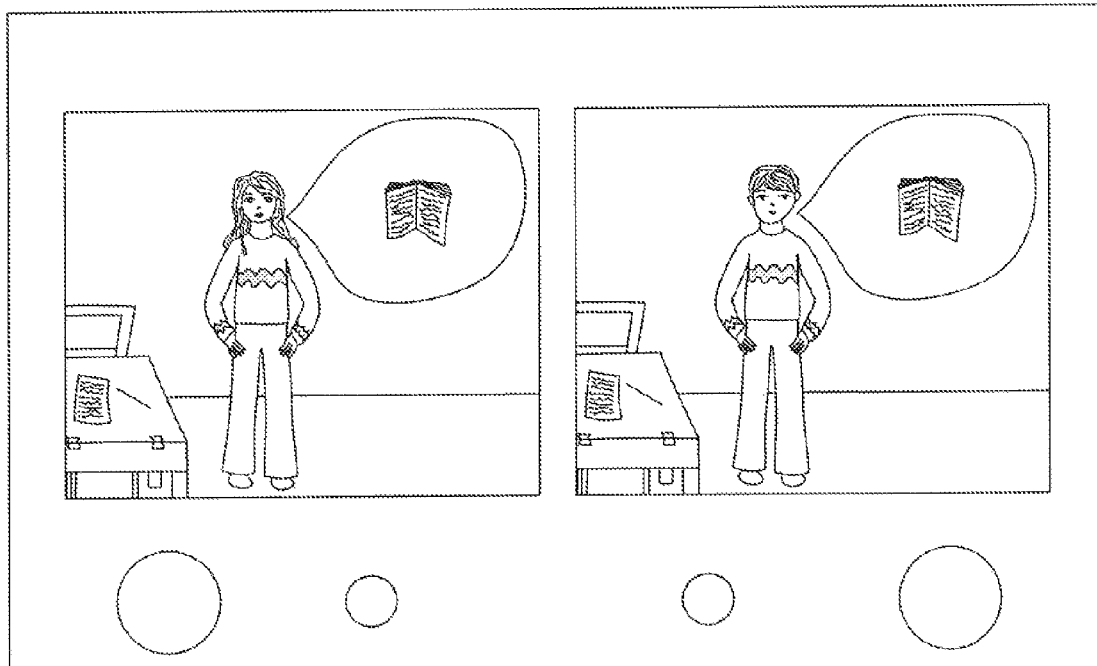
Figure 20F:
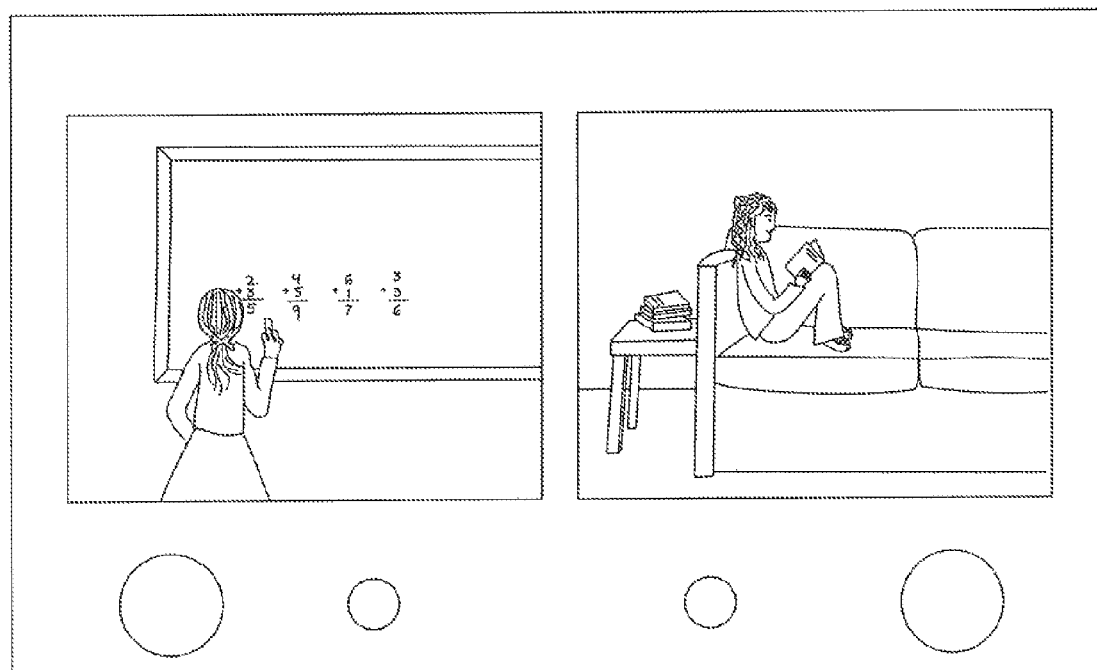

FIG. 19 illustrates, in control-flow fashion, the design and methodology for designing SAITAs. In step 1902, various types of presentation features, test-flow parameter values, such as the number of stimulus/response interactions in each sub-block and tutorial, are selected, and filters are employed to detect and substitute subject-appropriate words, images, sounds, and other presentation features for words, sounds, and other presentation features deemed inappropriate for the category of subject for which the test has been designed. Next, in step 1904, an initially designed test is administered to a number of subjects. In step 1906, the results of administration of the initial test are compiled and analyzed. When it is determined that particular stimuli in the test have high response latencies or elicit a large number of incorrect responses or produce a pattern of results opposite to what theory would predict (e.g. a whole sample of boys associating SELF with GIRL), as determined in step 1908, then the stimuli may be replaced with different stimuli and the stimuli that were replaced may be entered into various filters, in step 1910 (e.g., replacing the label and/or item SELF with the label and/or item ME). Similarly, if general latency problems, high variance, or other generalized problems are detected for the test, in step 1912, then the presentation may be altered, and altered presentation features may be added to filters or various presentation-feature tables may be updated for the particular category of subject for which the test is directed. If the number of problems detected after administering the test to a number of subjects, in step 1904, is greater than a threshold number of problems, as determined in step 1916, then the modified test is again administered to a number of subjects, beginning at step 1904, with control again flowing to step 1906 and beyond in order to again evaluate and modify the test.

Often, when developing and evaluating SAITA tests, it is very useful to explicitly question a subject about his or her attitudes or feelings toward the concepts and categories, the strength of association towards which are subsequently measured by the SAITA, in order to have explicit responses to compare to the strengths of associations measured by the SAITA. Such explicit information, derived from Likert-type tests, is used to evaluate scoring methods for ITA tests, as mentioned above. As one example, FIGS. 20A-F illustrate a Likert-type testing method adapted for preschool children, an example of a subject-appropriate Likert-type testing method ("SALTM"), that solicits explicit responses from subjects related to gender and math skills. The exemplary SALTM shown in FIGS. 20A-F comprises 6 panels displayed on a computer screen, such as panel 2002 in FIG. 20A, each panel comprising two images, such as images 2004-2005 in FIG. 20A. Each image is associated with two input features, such as input features 2006 and 2008 associated with image 2004 in FIG. 20A. Selection of the larger input feature 2006 indicates 2006 indicates strong agreement by a subject with a proposition posed by the test administrator related to the image 2002, and selection of the smaller input feature 2008 indicates less strong agreement by the subject with the proposition. In general, for each displayed panel, the subject is asked to select one image from the two images that bests answers or relates to a proposition, and then selects the appropriate input feature to indicate the strength of agreement by the subject that the selected image answers or relates to the proposition.

The panels shown in FIGS. 20A-F comprise two three-panel tests, directed to a female subject, the panels of which are directed to: (1) perceived gender identity; (2) perceived gender stereotype; and (3) perceived mathself-concept. For example, after display of the first panel, shown in FIG. 20A, the two children in the two images are described by name, e.g. Michael and Emily, and the subject is then asked which image is most like the subject, to assess the subject's perceived gender identity. Then, the subject is asked to indicate to what degree the selected images represent the subject. After display of the first panel, shown in FIG. 20B, the characters in the two images are described by name, e.g., Jacob and Sarah, as working on a math problem, and the subject is then asked which character more enjoys working on the math problem, to assess the subject's degree of gender stereotyping with respect to math ability. After display of the third panel, shown in FIG. 20C, the characters in the two images are described by name, e.g., Jessica and Ashley, as reading and working on a math problem, respectively, and the subject is then asked which character is most similar to the subject, to assess the subject's perceived math self-concept. The next three panels, shown in Figures D-F, are directed to assessing the same concepts, but change the order of, or activities of, the characters in the images. The subject's responses can be used to determine the subject's explicitly indicated strength of association between gender and math ability, to facilitate evaluation of the effectiveness of a subsequently administered SAITA test for strength of association between gender and math ability.

Figure 21:
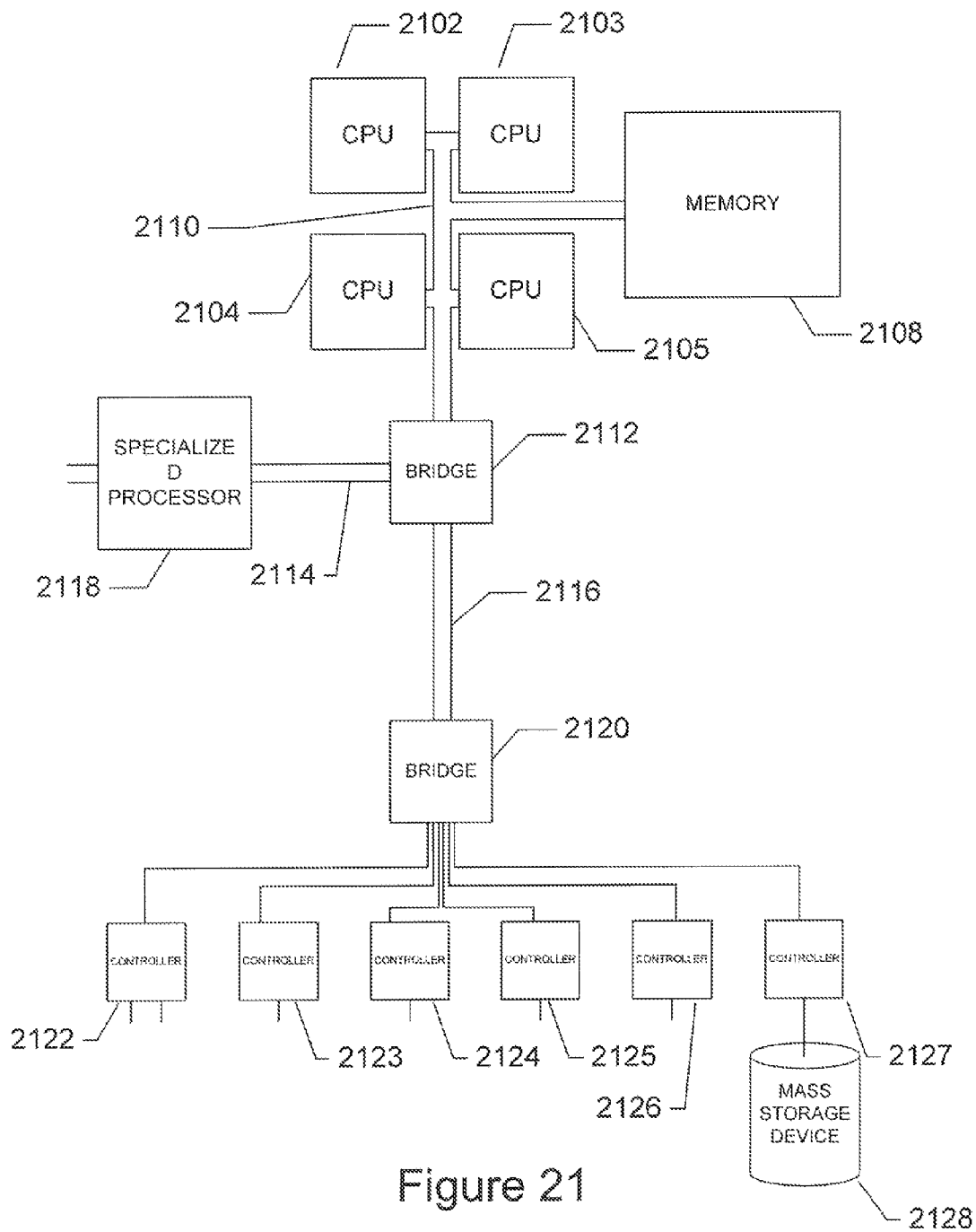
FIG. 21 illustrates a general-purpose computer architecture suitable for execution of IAT, SAITA, and other types of tests.

FIG. 21 illustrates a general-purpose computer architecture suitable for execution of IAT, SAITA, and other types of tests. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2102-2105, one or more electronic memories 2108 interconnected with the CPUs by a CPU/memory-subsystem bus 2110 or multiple busses, a first bridge 2112 that interconnects the CPU/memory-subsystem bus 2110 with additional busses 2114 and 2116, or other types of high-speed interconnection media, including multiple, high-speed serial interconnects. These busses or serial interconnections, in turn, connect the CPUs and memory with specialized processors, such as a graphics processor 2118, and with one or more additional bridges 2120, which are interconnected with high-speed serial links or with multiple controllers 2122-2127, such as controller 2127, that provide access to various different types of mass-storage devices 2128, electronic displays, input devices, and other such components, subcomponents, and computational resources. The electronic displays, including visual display screen, audio speakers, and other output interfaces, and the input devices, including mice, keyboards, touchscreens, and other such input interfaces, together constitute input and output interfaces that allow the computer system to interact with human users.

The magnetic disk platters, optical disks, or solid-state electronic memories of mass-storage devices are one example of a computer-readable medium on or within which data can be stored and from which stored data can be retrieved by a computer system. Additional examples of computer-readable media include removable disks, including optical and magnetic disks, electronic random access memories of various types, and flash memory. As would be well understood by those familiar with computing and electronics, the phrase "computer-readable medium," in the contexts of data storage and encoding of instructions of computer programs, refers to tangible, physical media, such as those described above, and not to electromagnetic waves and other transmission media used for transmission of data.

Although the present invention has been described in terms of particular embodiments, it is not intended that the invention be limited to these embodiments. Modifications within the spirit of the invention will be apparent to those skilled in the art. For example, any number of different implementations of SAITA tests using various different programming languages, computer platforms, and varying different programming parameters, including control structures, variables, modular organization, and other such parameters are possible. A large variety of different aspects of ITA development and administration may be varied, systematically, in order to adjust an SAITA optimally to any particular category of subjects. In the above description, color, words and phrasing, visual, audio, and other presentation parameters are adjusted, but additional parameters may be adjusted in alternative embodiments of the present invention. Stimulus and information presentation media may include visual and audio media, as discussed above, and may additionally include mechanical, electrical, and other types of presentation media perceptible to subjects.

It is appreciated that the previous description is provided to enable any person skilled in the art to make or use the present disclosure. Various modifications to the disclosed examples of SAITAs will be readily apparent to those skilled in the art, and the generic principles defined herein may be applied to other types of SAITAs and other tests without departing from the spirit or scope of the disclosure. Thus, the present disclosure is not intended to be limited to that disclosed in this document, but is instead to be accorded the widest scope consistent with the principles and novel features disclosed herein.

The invention claimed is:

1. A storage from which instructions are loaded into memory, the storage having stored thereon computer-executable instructions for implementing one or more routines that together compose a subject-appropriate implicit test of associations, the subject-appropriate implicit test of associations comprising:
   a subject-appropriate introduction that presents information to a test subject through one or more computer-system output interfaces; and
   two or more blocks, each block comprising—
      a subject-appropriate tutorial sub-block configured to introduce to a test subject, and train the test subject that—
         when stimuli corresponding to either of a first pair of concepts is displayed, the test subject should enter a first response through a first input feature; and
         when stimuli corresponding to either of a second pair of concepts is displayed, the test subject should enter a second response through a second input feature,
      wherein the subject-appropriate tutorial sub-block is further configured to monitor and detect misunderstandings and problems in a first performance of the test subject; and
      a subject-appropriate test sub-block configured to—
         administer a subject-appropriate number of interactions, wherein each interaction comprises a subject-appropriate pairing of a stimulus-presentation with a test-subject-response; and
         monitor and detect misunderstandings and problems in a second performance of the test subject;
   wherein at least one of the subject-appropriate introduction, subject-appropriate tutorial sub-block, and subject-appropriate test sub-block was created by—
      determining a test subject category; and
      matching to the test subject category—one or more particular computer-system input configurations or one or more particular computer-system output configurations, and
   wherein the test subject is associated with the test subject category.

2. The storage of claim 1 wherein the subject category is preschool children.

3. The storage of claim 2 wherein:
   the first concept of the first pair of concepts and the first concept of the second pair of concepts together comprise target concepts;
   the target concepts form a first conceptual dimension; and each target concept is assigned, by the subject-appropriate tutorial sub-block, to one of the first input feature or the second input feature; and wherein— the second concept of the first pair of concepts and the second concept of the second pair of concepts together comprise attribute concepts;

the attribute concepts form a second conceptual dimension, and each attribute concept is assigned, by the subject-appropriate tutorial sub-block, to a different one of the two input features.

4. The storage of claim 3 wherein stimuli and information are presented to the test subject using one or more presentation media selected from:

visual presentation using graphics and/or images displayed on a computer display screen;

audio presentation using recorded spoken passages, musical tones, and/or other recorded or synthesized sounds through computer speakers;

mechanical presentation via devices employed by the blind and disabled; and electrical presentation via devices employed by the blind and disabled.

5. The storage of claim 4 wherein stimuli directed to the first conceptual dimension are presented, during administration of the subject-appropriate number of interactions, using a first presentation medium and wherein stimuli directed to the second conceptual dimension are presented, during administration of the subject-appropriate number of interactions, using a second presentation medium different from the first presentation medium.

6. The storage of claim 5 wherein:

stimuli directed to at least one of the first conceptual dimension or the second conceptual dimension are presented visually;

the graphics or images directed to each concept of the conceptual dimension are displayed above color-coded regions of the computer display screen as collages; and each color-coded region matches the color of the input feature to which a response is input when the graphics or images are displayed.

7. The storage of claim 5 wherein the stimuli directed to the first conceptual dimension are presented using the first presentation medium along with cues presented using the second presentation medium; and wherein the stimuli directed to the first conceptual dimension are presented using the second presentation medium along with cues presented using the first presentation medium.

8. The storage of claim 5 wherein the a subject-appropriate tutorial sub-block and the subject-appropriate test sub-block are further configured to provide, at intervals, positive feedback presentations.

9. The storage of claim 5 wherein the subject-appropriate test sub-block is further configured to, when a subject incorrectly responds to a presented stimulus, provide neutral, subject-appropriate feedback.

10. The storage of claim 1 wherein the subject-appropriate tutorial sub-block or the a subject-appropriate test sub-block monitors and detects misunderstandings by:

computing the elapsed time between presentation of a stimulus and detection of a response by a test subject;

maintaining a running variance and latency calculation and updating the running variance and latency calculation after computing the elapsed time between presentation of a stimulus and detection of a response by a test subject; and determining whether the computed elapsed time is greater than a latency threshold value and whether the running variance is greater than a variance threshold.

11. A method for administering a subject-appropriate implicit test of associations through one or more computer-system input and output interfaces, the method comprising:

providing, by a computer-system output interface, a subject-appropriate introduction that presents information to a test subject through the one or more computer-system output interfaces; and administering two or more blocks, the two or more blocks comprising— a subject-appropriate tutorial sub-block configured to, using the computer-system output interface, introduce to a test subject and train the test subject that— when stimuli corresponding to either of a first pair of concepts is displayed, the test subject should enter a first response through a first input feature; and when stimuli corresponding to either of a second pair of concepts is displayed, the test subject should enter a second response through a second input feature, wherein the subject-appropriate tutorial sub-block is further configured to monitor and detect misunderstandings and problems in a first performance of the test subject; and a subject-appropriate test sub-block configured to— administer a subject-appropriate number of interactions, wherein each interaction comprises a subject-appropriate pairing of a stimulus-presentation with a test-subject-response; and monitor and detect misunderstandings and problems in a second performance of the test subject;

wherein at least one of the subject-appropriate introduction, subject-appropriate tutorial sub-block, and subject-appropriate test sub-block was created by— determining a test subject category; and matching to the test subject category—one or more particular computer-system input configurations or one more particular computer-system output configurations, wherein the test subject is associated with the test subject category.

12. The method of claim 11 wherein the subject category is preschool children.

13. The method of claim 12 wherein:

the first concept of the first pair of concepts and the first concept of the second pair of concepts together comprise target concepts;

the target concepts form a first conceptual dimension; and each target concept is assigned, by the subject-appropriate tutorial sub-block, to one of the first input feature or the second input feature; and wherein— the second concept of the first pair of concepts and the second concept of the second pair of concepts together comprise attribute concepts;

the attribute concepts form a second conceptual dimension; and each attribute concept is assigned, by the subject-appropriate tutorial sub-block, to a different one of the two input features.

14. The method of claim 13, further comprising presenting stimuli and information to the test subject using one or more presentation media selected from:
- visual presentation using graphics and/or images;
- audio presentation using recorded spoken passages, musical tones, and/or other recorded or synthesized sounds;
- mechanical presentation via devices employed by the blind and disabled; and
- electrical presentation via devices employed by the blind and disabled.

15. The method of claim 14, further comprising presenting stimuli directed to the first conceptual dimension, during administration of the subject-appropriate number of interactions, using a first presentation medium and presenting stimuli directed to the second conceptual dimension, during administration of the subject-appropriate number of interactions, using a second presentation medium different from the first presentation medium.

16. The method of claim 15, further comprising:
- visually presenting stimuli directed to one conceptual dimension;
- displaying the graphics or images directed to each concept of the conceptual dimension above color-coded regions of the computer display screen as collages, with each color-coded region matching the color of the input feature to which a response is input when the graphics or images are displayed.

17. The method of claim 15, further comprising:
- presenting the stimuli directed to the first conceptual dimension using the first presentation medium along with cues presented using the second presentation medium; and
- presenting the stimuli directed to the first conceptual dimension using the second presentation medium along with cues presented using the first presentation medium.

18. The method of claim 15, further comprising providing, by the subject-appropriate tutorial sub-block or by the subject-appropriate test sub-block, at intervals and when monitoring detects problems or lack of attention on the part of the test subject, positive feedback presentations.

19. The method of claim 15, further comprising, when a subject incorrectly responds to a presented stimulus, providing neutral, subject-appropriate feedback.

20. The method of claim 11, further comprising administering, by a human administrator, at least one of the two or more blocks.

21. The method of claim 11 wherein the subject-appropriate tutorial sub-block or the a subject-appropriate test sub-block monitors and detects misunderstandings by:
- computing the elapsed time between presentation of a stimulus and detection of a response by a test subject;
- maintaining a running variance and latency calculation and updating the running variance and latency calculation after computing the elapsed time between presentation of a stimulus and detection of a response by a test subject; and
- determining whether the computed elapsed time is greater than a latency threshold value and whether the running variance is greater than a variance threshold.

22. The method of claim 11, further comprising providing a response input device with only two input features, the two input features comprising a first input feature and a second input feature, wherein the first input feature has a first color and the second input feature has a second color, and wherein the first input feature changes color to a third color and the second input feature changes color to a fourth color.

23. A method for developing a subject-appropriate implicit test of associations, the method comprising:
- selecting a category of subjects to which the subject-appropriate implicit test of associations is directed;
- selecting, based on the selected category, presentation features;
- selecting, based on the selected category, a response input device appropriate for the selected test target;
- developing, based on the selected category and using the selected presentation features, blocks with chosen interactions for the test target, wherein a number of the chosen interactions is based on the selected category;
- substituting, for any words, phrase, audio stimuli, visual stimuli, or colors previously determined to be inappropriate for the selected category, words, phrase, audio stimuli, visual stimuli, or colors that have not been previously found inappropriate for the selected category;
- providing positive feedback presentations, wherein a frequency and a content of the positive feedback presentations are based on the selected category;
- incorporating monitoring routines and methods to determine whether a test subject remains fully engaged, alert, and positively oriented towards the test; and
- employing subject-appropriate Likert-type testing of strengths of association to complement and facilitate evaluation of strengths of association measured by the subject-appropriate implicit test of associations.

* * * * *

UNITED STATES PATENT AND TRADEMARK OFFICE
CERTIFICATE OF CORRECTION

PATENT NO. : 8,696,360 B2
APPLICATION NO. : 13/252908
DATED : April 15, 2014
INVENTOR(S) : Dario Cvencek et al.

It is certified that error appears in the above-identified patent and that said Letters Patent is hereby corrected as shown below:

In the Drawings:

On sheet 9 of 34, in Figure 2C, line 7, delete "$\sigma_{\hat{p}}$" and insert -- $\sigma_p$ --, therefor.

In the Specification:

In column 6, line 38, delete "σ₁for" and insert -- σ₁ for --, therefor.

In column 6, line 40, delete "$P1\hat{0}P2$" and insert -- $P1 \wedge P2$ --, therefor.

In column 6, line 40, delete "$P1\hat{0}P2$," and insert -- $P1 \wedge P2$, --, therefor.

In column 12, line 13-46, below "control-flow diagram. The" delete "ITA is introduced and explained,...problems that may arise." and insert the same on Col. 12, Line 14 after "The" as the continuation of the same paragraph.

In column 14, line 33, delete "arc" and insert -- are --, therefor.

In column 14, line 56, delete "he" and insert -- be --, therefor.

In column 16, line 7, delete "arc" and insert -- are --, therefor.

In column 16, line 51, delete "mathself-concept." and insert -- math self-concept. --, therefor.

In column 17, line 29, delete "arc" and insert -- are --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,696,360 B2

In the Claims

In column 19, line 53, in claim 8, delete "the a" and insert -- the --, therefor.

In column 19, line 62, in claim 10, delete "the a" and insert -- the --, therefor.

In column 20, line 44-45, in claim 11, delete "one more" and insert -- one or more --, therefor.

In column 22, line 2, in claim 21, delete "the a" and insert -- the --, therefor.